(12) United States Patent
Pohlack

(10) Patent No.: US 10,868,665 B1
(45) Date of Patent: *Dec. 15, 2020

(54) MITIGATING TIMING SIDE-CHANNEL ATTACKS BY OBSCURING ACCESSES TO SENSITIVE DATA

(71) Applicant: Amazon Technologies, Inc., Seattle, WA (US)

(72) Inventor: Martin Thomas Pohlack, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,345

(22) Filed: May 18, 2015

(51) Int. Cl.
| | |
|---|---|
| G06F 11/00 | (2006.01) |
| H04L 9/00 | (2006.01) |
| H04L 29/06 | (2006.01) |
| G06F 12/14 | (2006.01) |

(52) U.S. Cl.
CPC .............. H04L 9/002 (2013.01); H04L 63/20 (2013.01); H04L 2209/24 (2013.01)

(58) Field of Classification Search
CPC ...... G06F 12/1408; G06F 21/00; G06F 21/54; H04L 63/1416; H04L 63/1441; H04L 63/162
USPC ......... 709/212, 217; 713/165, 168; 726/4, 7, 726/22, 23, 27; 380/44
See application file for complete search history.

(56) References Cited

U.S. PATENT DOCUMENTS

| | | | | | |
|---|---|---|---|---|---|
| 5,822,591 | A | * | 10/1998 | Hochmuth | G06F 8/30 717/148 |
| 5,877,821 | A | * | 3/1999 | Newlin | H04N 7/147 348/14.08 |
| 6,564,218 | B1 | * | 5/2003 | Roth | G06F 16/9574 |
| 6,851,046 | B1 | * | 2/2005 | Delvaux | G06F 9/30054 712/236 |

(Continued)

OTHER PUBLICATIONS http://en.wikipedia.org/wiki/Kernel_SamePage_Merging_%28KSM%29, Updated Sep. 16, 2013, downloaded Feb. 28, 2014, pp. 1-2.

(Continued)

*Primary Examiner* — Gary S Gracia
(74) *Attorney, Agent, or Firm* — Robert C. Kowert; Kowert, Hood, Munyon, Rankin & Goetzel, P.C.

(57) ABSTRACT

A virtualization service that hosts multiple guests may provide utilities for use in protecting sensitive or secret information from timing side-channel attacks by obscuring accesses to data structures that have been designated as potential targets of such attacks. The service may provide a compiler or analysis tool that identifies data structures within an application that contain, or that are indexed using, sensitive or secret information. The compiler may modify the application code (or an executable representation thereof) to obscure accesses to particular elements in the data structures. For example, the layout or indexing of a sensitive data structure may be scrambled during execution, or elements of multiple data structures may be interleaved within a single, merged data structure. The scrambling may be performed using an unpredictable address translation function (e.g., one that is parameterized during initialization using a random number obtained at runtime), which may be subsequently modified (e.g., periodically).

16 Claims, 12 Drawing Sheets

(56) References Cited

U.S. PATENT DOCUMENTS

| | | | |
|---|---|---|---|
| 7,162,031 B1* | 1/2007 | Roelofsen | H04L 9/0625 380/277 |
| 7,461,232 B2* | 12/2008 | Nicolai | G06F 12/1036 711/163 |
| 7,624,126 B2* | 11/2009 | Pizzo | G06F 16/9574 |
| 7,984,073 B1* | 7/2011 | Basiago | G06F 16/22 707/802 |
| 8,108,375 B2* | 1/2012 | Barsness | G06F 16/2454 707/705 |
| 8,375,420 B2 | 2/2013 | Farrell et al. | |
| 8,543,554 B1* | 9/2013 | Singh | G06F 16/24552 707/690 |
| 8,627,414 B1* | 1/2014 | McCune | H04L 9/3234 726/4 |
| 9,858,440 B1* | 1/2018 | Wang | G06F 21/54 |
| 2001/0018736 A1* | 8/2001 | Hashimoto | G06F 21/123 713/1 |
| 2003/0044003 A1 | 3/2003 | Chari et al. | |
| 2004/0064668 A1* | 4/2004 | Kjos | G06F 12/1036 711/202 |
| 2004/0230760 A1* | 11/2004 | Check | G06F 9/383 711/168 |
| 2005/0172091 A1* | 8/2005 | Rotithor | G06F 13/161 711/157 |
| 2006/0129956 A1* | 6/2006 | Ward | G06F 30/3323 716/136 |
| 2007/0283324 A1* | 12/2007 | Geisinger | G06F 9/455 717/120 |
| 2008/0022102 A1 | 1/2008 | Venkatesan et al. | |
| 2008/0098173 A1* | 4/2008 | Chidambaran | G06F 16/24552 711/118 |
| 2009/0010424 A1* | 1/2009 | Qi | G06F 21/572 380/28 |
| 2009/0144258 A1* | 6/2009 | Taylor | G06F 16/2453 |
| 2009/0172304 A1* | 7/2009 | Gueron | G06F 21/556 711/154 |
| 2009/0271867 A1* | 10/2009 | Zhang | G06F 21/566 726/24 |
| 2010/0332578 A1 | 12/2010 | Gopal et al. | |
| 2011/0035601 A1* | 2/2011 | Davidson | G06F 21/14 713/190 |
| 2011/0055592 A1* | 3/2011 | Teuwen | H04L 9/0625 713/190 |
| 2011/0179490 A1* | 7/2011 | Jin | G06F 21/552 726/24 |
| 2012/0173517 A1* | 7/2012 | Lang | G06F 16/24561 707/722 |
| 2012/0297110 A1 | 11/2012 | Kavi | |
| 2013/0007881 A1 | 1/2013 | Liem et al. | |
| 2013/0080493 A1 | 3/2013 | Gueron et al. | |
| 2013/0301826 A1 | 11/2013 | Gueron et al. | |
| 2014/0025893 A1* | 1/2014 | Brown | G06F 12/1027 711/125 |
| 2014/0059688 A1 | 2/2014 | Margalit | |
| 2014/0115292 A1* | 4/2014 | McLachlan | G06F 12/02 711/170 |
| 2014/0192983 A1 | 7/2014 | Hamilton et al. | |
| 2014/0259161 A1* | 9/2014 | Kastner | G06F 21/556 726/22 |
| 2014/0279929 A1* | 9/2014 | Gupta | G06F 16/2365 707/683 |
| 2014/0281512 A1* | 9/2014 | Arasu | H04L 63/062 713/165 |
| 2014/0304294 A1* | 10/2014 | Sharma | G06F 16/24539 707/769 |
| 2014/0310232 A1* | 10/2014 | Plattner | G06F 16/24552 707/602 |
| 2014/0317084 A1* | 10/2014 | Chaudhry | G06F 16/24552 707/713 |
| 2014/0359778 A1* | 12/2014 | Kruglick | G06F 9/45533 726/25 |
| 2015/0047049 A1* | 2/2015 | Panchenko | G06F 21/14 726/26 |
| 2015/0082425 A1 | 3/2015 | Johnson et al. | |
| 2015/0092941 A1 | 4/2015 | Ghosh | |

OTHER PUBLICATIONS

Yuval Yarom, et al., "Flush+Reload: a High Resolution, Low Noise, L3 Cache Side-Channel Attack". Cryptology ePrint Archive, Report 2013/448, Jul. 18, 2013, pp. 1-9.

Joseph Bonneau, et al. "Cache-Collision Timing Attacks Against AES", Cryptographic Hardware and Embedded Systems (CHES 2006), Springer-Verlag, 2006, pp. 201-215.

Huzaifa Sidhpurwala, et al., "It's all a question of time—AES timing attacks on OpenSSL", https://securityblog.redhat.com/2014/07/02/its-all-a-question-of-time-aes-timing-attacks-on-openssl/, Posted on Jul. 2, 2014 downloaded on Apr. 24, 2015, pp. 1-2.

"Cryptographic nonce", Wikipedia, Updated Oct. 13, 2014, pp. 1-3.

U.S. Appl. No. 14/192,480, filed Feb. 27, 2014, Martin Thomas Pohlack.

U.S. Appl. No. 14/614,077, filed Feb. 4, 2015, Martin Thomas Pohlack.

U.S. Appl. No. 14/715,333, filed May 18, 2015, Martin Thomas Pohlack.

* cited by examiner

| data element 117 661 | data element 946 662 | data element 2 663 | data element 1003 664 | ... | data element 425 675 | data element 28 676 | table 650

*FIG. 6B*

| data element 0 610 | data element 1 611 | data element 2 612 | data element 3 613 | ... | data element 1022 625 | data element 1023 626 | table 600

*FIG. 6A*

| data element A123 761 | data element B6 762 | data element B431 763 | data element A12 764 | ... | data element B203 771 | data element A245 772 | data element B84 773 | table 760

*FIG. 7B*

| data element A0 710 | data element A1 711 | ... | data element A255 720 | table 700

| data element B0 740 | data element B1 741 | ... | data element B511 750 | table 720

*FIG. 7A*

MITIGATING TIMING SIDE-CHANNEL ATTACKS BY OBSCURING ACCESSES TO SENSITIVE DATA

BACKGROUND

The advent of virtualization technologies for commodity hardware has provided benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a service provider and be provided with varying numbers of virtual machine resources on an "as needed" basis or at least on an "as requested" basis.

In virtualized computing environments and in local computing systems, system resources, including physical memory pages, are sometimes shared between processes or applications executing in the system. For example, in a local system, malicious applications that attempt to spy on other executing processes or applications might share physical memory pages with those other processes or applications by means of a shared library. In a virtualized environment, malicious applications might share physical memory pages with a targeted process or application by means of Kernel SamePage Merging (KSM), in which identical memory pages are shared between different processes or applications (and, in some cases, users).

By measuring the timing of accesses to main memory on shared pages, a malicious application can be used to detect whether a target memory area resides in a cache. This cache residency can be correlated with recent usage of data in the memory area in the system by one of the processes or applications that shares access to the target memory area. An attacking program can continuously flush relevant memory areas from the caches in the system and observe the timing of accesses to those memory areas, thereby monitoring the behavior of a target program. Such attacks are sometimes referred to as timing side-channel attacks.

Some existing systems, in an attempt to prevent a timing side-channel attack, disable page de-duplication in the operating environment entirely. However, for virtualized environments, page de-duplication might be a legitimate and useful thing to do. Some hypervisors perform page de-duplication by default, and it can be difficult to fully disable page de-duplication. For example, if multiple virtual machines are started based on the same base image on disk, there can be many pages shared between them without the hypervisor doing anything. Note that in some operating systems, it is not possible to be sure whether an underlying hypervisor is disabling page de-duplication only for particular pages or for the entire shared memory system unless this feature can be completely controlled in a manner that is visible to a security module or another privileged user process. Similarly, on a local machine, it might be extremely impractical (and/or prohibitively costly in terms of time and/or resources) to disable page de-duplication. For example, disabling page de-duplication means that each application executing on the local machine require more memory, and application startup might be very slow because of the need to load all of the shared libraries for each application.

BRIEF DESCRIPTION OF THE DRAWINGS

FIGS. 6A-6B and 7A-7B illustrate examples of the application of non-standard address translation functions to scramble table data, according to at least some embodiments.

Figure 1:
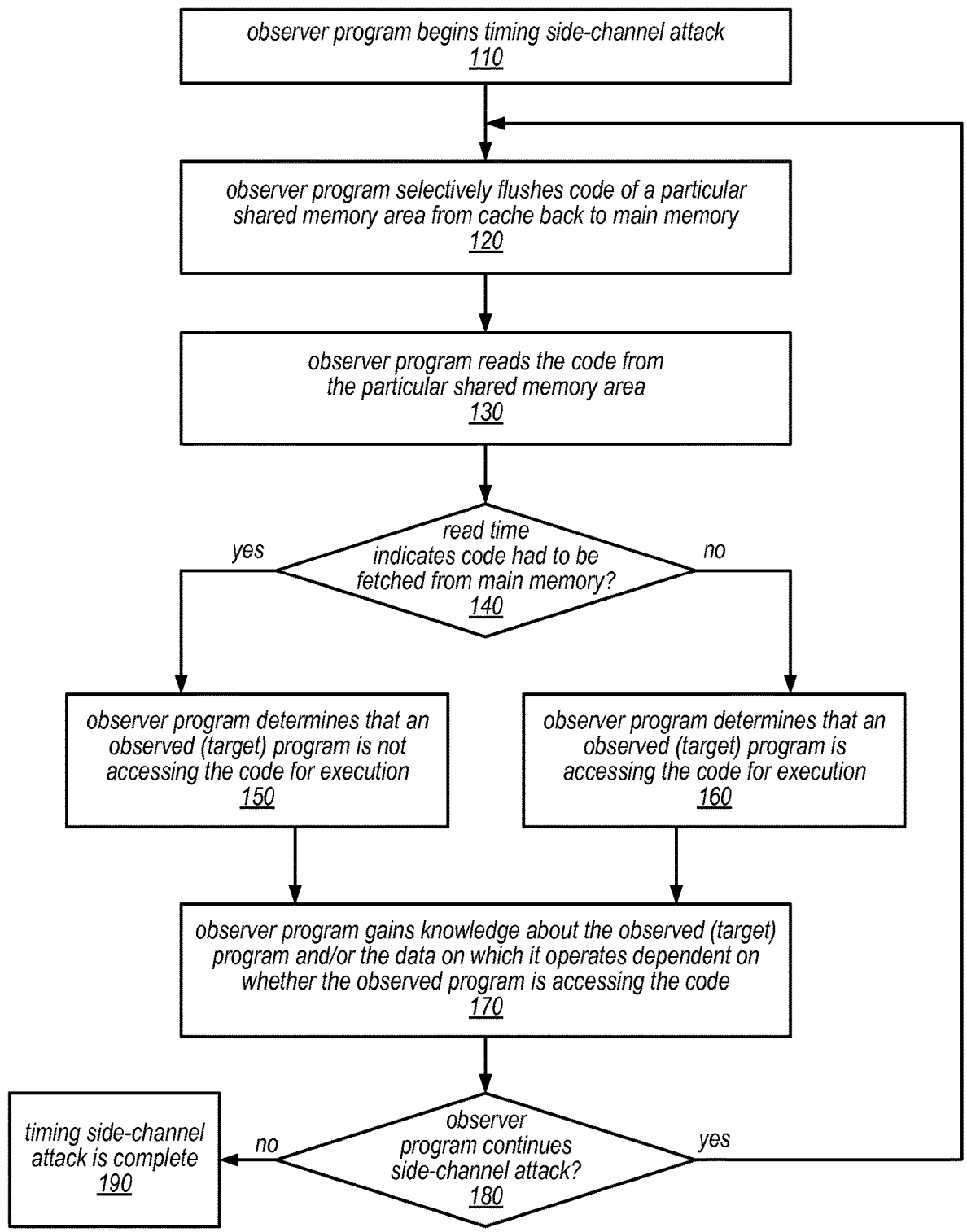
FIG. 1 is a flow diagram illustrating one example of a timing side-channel attack that may be mitigated using the techniques described herein.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems and methods described herein may be used to mitigate the damage that can be done using timing side-channel attacks (e.g., the information that can be gleaned by such attacks) in virtualized computing systems and/or in local (single) systems in which physical memory pages are shared between processes, applications, and/or users. In some embodiments, service customers or subscribers on whose behalf applications execute on a guest virtual machine may protect themselves from potential timing side-channel attacks by taking steps to obscure accesses to critical code paths (e.g., encryption functions) and/or sensitive data (e.g., cryptography keys; data derived from, or usable to generate, cryptography keys; or other secret information) during execution of the applications. In other embodiments, the service (or the underlying system) may be configured to apply the techniques described herein to obscure accesses to critical code paths and/or sensitive/secret data on behalf of service customers or subscribers.

As described in more detail below, accesses to particular code paths (e.g., alternative code paths that are selected using a conditional expression that is dependent on a secret) may be obscured by preparing applications so that when they are executed, instructions from multiple code paths are interleaved and fetched into the same cache lines. In addition, accesses to particular elements of an indexed data structure (e.g., a data structure in which the data elements would typically be mapped to locations in the data structure using a standard, predictable address translation function) may be obscured by scrambling the data in the data structure (e.g., using a non-standard and unpredictable address translation function) and/or by merging multiple tables into a single table and interleaving the data elements of the original tables within the merged table.

In general, the term "side-channel" may refer to a channel of information flow in a computing system that was not intended for the use of processes or applications executing in the system, e.g., a channel of information flow that is not programmed explicitly by the operating system, but that can be opened in some systems in which shared resources are used. For example, in one type of timing side-channel attack, there may be at least two parties involved, the observation target and the observer (i.e., the attacker). These two parties may share system resources, including one or more processors (CPUs) and main memory, and as a consequence, they may both use the cache hierarchy that sits between the CPU(s) and main memory.

In such a timing side-channel attack, the attacking process or application may monitor the access times to various memory areas in order to determine whether a particular area of memory was in the cache before the attacking process or application accessed the particular memory area (e.g., before the attacker queried one or more locations in the particular memory area using a read or load type instruction) or whether it had to be fetched from main memory. In this case, the side-channel is a timing side-channel that allows the attacker to glean information about a target process or application by determining how long it takes to read or to write to particular memory locations. In this example, the attacker may also modify the side-channel, e.g., by clearing the cache selectively or fully using a cache line flush type instruction, if available. For example, the CLFLUSH instruction of the x86 instruction set can be used in any context (including in user applications) and can be used to remove all memory areas that are associated with a virtual address that is a parameter of the instruction from the cache hierarchy (i.e., to flush the cache lines corresponding to those memory areas from all memory caches). In other words, in order to remove the contents of a particular memory from the cache, a process or application may pass one or more addresses associated with the particular memory area to a CLFLUSH instruction or another similar cache line flush type instruction. The execution of the cache line flush type instruction may, in the hardware of the processor, clear all of the corresponding cache lines and move their contents back to memory, such that when and if a process or application subsequently attempts to access them, they will have to be fetched from main memory. Because fetching information from main memory takes much longer than fetching that same information from cache (e.g., on the order of several hundred cycles compared with a single digit number of cycles for information resident in a level 1 cache), an attacking program that accesses the particular memory area after flushing its contents from the cache may be able to distinguish whether another process or application has accessed the particular memory area between the time that the cache line flush type instruction was executed by the attacking program and the time the attacking program subsequently accesses the particular memory area. Note that the CLFLUSH instruction is not a privileged instruction and does not trap. Therefore, it cannot easily be virtualized or disabled to prevent or slow down the attack.

In many (if not most) modern operating systems, there is a lot of code that is not directly linked into the program itself but resides in shared libraries. In general, it would be wasteful to include the code in main memory multiple times, especially portions of the code that are not modified. For example, the shared code itself (if not also the data) may typically be mapped in read-only mode. Therefore, only one physical copy of the shared code may need to be maintained in main memory. The physical memory pages that contain the shared code may be mapped into the different processes executing in the system using different virtual addresses. However, since the physical memory pages are shared, whenever a program A executes a cache line flush type instruction to flush a certain memory area from the cache, this has an effect on the physical page (and/or on the copies of the physical page that the cache holds). In other words, the cache line flush type instruction will flush the contents of the cache to the one and only copy of the code in physical memory, and the effect of the cache line flush type instruction can be seen in all the other programs that map in the same shared memory area.

In one example of a timing side-channel attack, an attacking program maps in the same code that is used by an encryption program and then starts to selectively flush certain areas of the code from the cache and to measure the time it takes to read those memory areas back (e.g., it executes multiple cache line flush type instructions, each followed by a read or load type instruction). In this example, by observing the timing of the read or load type instructions, the attacking program can determine whether another process or application has used (or is currently using) various portions of the code (e.g., to determine if particular code paths or branches are being taken). Using this approach, the attacking program may be able to determine what the encryption program is doing by observing which code paths or branches it takes. For example, if the attacking program determines that a target program executed branch A, and the attacking program knows the specific value of a branch condition that leads to this branch being taken, it may be able to draw conclusions about the data that is being processed by the target program. In this example, such an attack may be used to extract information about cryptographic keys (e.g., data derived from, or usable to generate, cryptography keys, or the cryptography keys themselves) from the target program.

Note that some systems that implement virtualization include a same page sharing feature (e.g., implemented by the hypervisor), which may also be referred to herein as "same-page merging". In such systems, sharing of physical pages may not only be happening within one virtual machine, but may be propagated throughout the whole system. For example, the hypervisor may scan the contents of physical memory pages, and whenever it finds the same pages, it may merge them into a single copy backed by one physical page. In such systems, a side-channel attack may not only be implemented within a single guest but across guests.

One example of a timing side-channel attack that may be mitigated using the techniques described herein is illustrated by the flow diagram in FIG. 1. As illustrated in this example, an observer program begins a timing side-channel attack (as in 110), and selectively flushes the code of a particular shared memory area from a cache back to main memory (as in 120). The observer program then reads the code (i.e., the code that it flushed from the cache) from the particular shared memory area, as in 130.

If the read time indicates that the code did not have to be fetched from main memory (e.g., that it had been read back into the cache since it was flushed from the cache by the observer program), the observer program determines that an observed (target) program is currently and/or frequently accessing the code in that particular shared memory area for execution. This is illustrated in FIG. 1 by the negative exit from 140 and 160. On the other hand, if the read time indicates that the code had to be fetched from main memory (e.g., that it had not been read back into the cache since it was flushed from the cache by the observer program), the observer program determines that the observed (target) program is not currently or frequently accessing the code in that particular shared memory area for execution. This is illustrated in FIG. 1 by the positive exit from 140 and 150.

In either case, the observer program gains knowledge about the observed (target) program and/or the data on which it operates dependent on whether or not the observed program is currently and/or frequently accessing the code in the particular shared memory area, as in 170. In other words, the observer program is able to infer something about the observed (target) program and/or the data on which it operates dependent on whether or not the observed program has recently executed or is currently executing particular portions of the code (e.g., code on particular code paths or branches). If the observer program is continuing its side-channel attack (shown as the positive exit from 180), the operations illustrated at 120 to 170 are repeated, possibly targeting different shared memory locations, as the observer program attempts to gain more knowledge about the observed (target) program and/or the data on which it operates. This is illustrated in FIG. 1 by the feedback from the positive exit of 180 to 120. If the observer program is not continuing its side-channel attack (or once the observer program completes its attack using multiple iterations of the operations illustrated in FIG. 1), the timing side-channel attack is complete. This is illustrated in FIG. 1 by the negative exit from 180 and 190.

As previously noted, in virtualized environments (and also in some local systems), shared pages between attackers (programs that try to spy on target programs) and target programs might share physical memory pages, either via means of shared libraries in a single system or via a page de-duplication technique involving same-page merging (e.g., kernel-samepage-merging, or KSM). In these systems, observing the timing of accesses to main memory on shared pages can be used to detect whether a target memory area resides in a cache or has to be fetched from main memory. This cache residency correlates with recent usage of data or code in the memory area in the system. In some cases, an attacker can continuously flush relevant memory areas from caches and observe timing again, thereby monitoring the behavior of the target program. Note that this type of attack may allow data usage to be monitored at or above cache line granularity, but not below.

While some systems that provide virtualization services to clients may employ techniques on the host (e.g., on the bare metal on a host that has multiple guests executing on it) to detect, prevent, mitigate, and/or curtail this type of timing side-channel attack (e.g., by emulating a trap on a cache line flush type instruction) to protect guest processes from other guests. While the core function of the hypervisor is to separate the guests, the types of timing side-channel attacks that are the target of the techniques described above can be difficult for the host to prevent. In some cases, it may be possible to have some code in the hypervisor that does most of the work of protecting important or sensitive pages in memory, along with a driver in the guest that tells the hypervisor what it thinks is important to protect. In other cases, the hypervisor may reside in a different domain of trust. In other words, the guest operating systems and guest applications executing thereof may be controlled by virtualization service customers (e.g., service subscribers), and those customers may have (more or less) complete control over them. The hypervisor, on the other hand, may be provided by the service provider, which typically does not give access to the hypervisor source code or binary code to its customers. In some embodiments, customers may be able to trust that the service provider does not attempt same-page merging at all. However, this may be contrary to the customer's security policies on a political or organizational level.

In some embodiments, a guest that is one of multiple guests operating in a given virtualized environment may only have access to its own domain. Therefore, since it cannot operate outside of that domain, the options for a guest to use in avoiding timing side-channel attacks (e.g., attacks in which another misbehaving guest attempts to take advantage of shared memory pages to spy on the code and/or data pages that are being accessed by the guest) may be limited. In some embodiments, the techniques described herein may be used to mitigate the negative effects of same-page merging in a virtualized environment. For example, in some embodiments, the techniques described herein may be employed in mitigating the damage done by timing side-channel attacks based on same-page merging, with or without help from the guest operating system and/or from the virtualization system.

As described in more detail below, the techniques described herein may be applied to cold paths (or sets of critical code paths) that may be more important to protect than others. For example, in some embodiments, a target program may have a notion about which of the functions it calls include (or should be considered) critical code paths that are more important to protect from timing side-channel attacks. For example, these critical code paths may include any code paths that are involved in critical operations, such as operations that in some way process secret data (e.g., cryptography keys, or important clear-text data). As described above, same-page merging techniques such as KSM rely on the fact that whole pages may be similar in distinct processes or virtual machines. Thus, code pages are often the main target of such attacks because there is a realistic chance for an attacker to have similar encryption programs or libraries available. In some cases dynamically constructed data structures in memory may be a target of an attack, e.g., if their layout is somewhat predictable at the page level.

As described in more detail below, in some embodiments, the security techniques described herein may limit the amount of information that can be gleaned through timing side-channel attacks using any one of several mechanisms to obscure accesses to critical code paths and/or sensitive/secret data. In other words, by hiding critical code paths or sensitive/secret data (or indices usable to access that data) in the same cache line or set of cache lines, the observability of a timing side-channel attach (in which an attacker repeatedly flushes the cache in order to observe which lines are being accessed) may be defeated.

In some embodiments, the mechanisms may include merging the instructions of different code path alternatives into the same cache lines, thereby flying under the attacker's radar by moving all relevant code into the same cache working set. For example, the fundamental resolution at which an attacker can observe a program may be at cache line granularity. Therefore, in order to obscure accesses to particular critical code paths, the differences between them may be moved below cache line granularity. As previously noted, when there are alternative code paths in an application, it is sometimes the case that a conditional expression used to decide which code path to take is in some way interesting or valuable (e.g., it may be dependent on sensitive or secret information, such as a bit in an encryption key). In such cases, by observing which path is taken, at attacker may be able to deduce some information about the value of the conditional expression that was used to make this decision (and/or the sensitive/secret information on which it depends). For example, if an application includes a loop that iterates over the bits of a cryptography key and, depending on the state of each bit, executes or does not execute a multiplication function (e.g., as part of an encryption operation), by sampling (bit by bit) whether the multiplication function is entered, an attacker may be able to determine the state of each of the bits. More specifically, by observing which cache lines are accessed (and its instructions are executed) by a target program, an attacker may be able to deduce information about bits of the cryptographic key.

To prevent this type of attack (or to prevent such an attack from yielding any sensitive or secret information), the techniques described herein may be used to transform code in critical code paths such that both alternative paths transition through the same set of cache lines. This may prevent an attacker from gaining additional knowledge by monitoring the target's cache working set. Note that merging the instructions from two different code paths is the opposite of what a compiler typically does. For example, compilers are typically interested in generating very long and predictable sequences of instructions so that the processor can continue executing instructions in a straight line, with a lot of locality and with successful pre-fetching. Typically, if there are two alternative code paths, the compiler would put them behind each other in sequence (but would never interleave them). The security techniques described herein may do just the opposite. For example, in some embodiments, these techniques may include analyzing the two code paths, breaking them up into smaller pieces (or "chunks"), and then puzzling together the different chunks of code so that each cache line has at least a portion of one code chunk from each code path. In some embodiments, each chunk of code may contain fewer bytes than can fit into a single cache line, while in other embodiments (e.g., embodiments in which a single chunk of code can span a boundary between two cache lines), each chunk of code may contain more bytes than fit into a single cache line, but fewer than can fit into two cache lines. Using this approach, an attacker may never be able to determine, by merely looking at the set of cache lines that were touched, which code path was taken, because all of the different options always touch all of the same cache lines. Note that, in some embodiments, the chunks of a given code path that are interleaved with code chunks of another code path on multiple cache lines may be linked together using small jump instructions so that the effect of the execution is the same, albeit a bit slower than if the instructions of the two code paths had not been merged.

As described in more detail below, a related technique (e.g., one in which sensitive/secret data, or indices usable to access that data are hidden in the same cache line or set of cache lines) may be applied to interesting data objects (cryptographic keys or derived data, or any sensitive or secret data stored in tables or other data structures). For example, in some cases, an application may access a data object that includes different members or a large table to perform lookup operations into particular locations depending on parts of a secret. In such cases, by observing the locations in the table that are targeted by a lookup, an attacker may be able to deduce some bits of the offset (e.g., bits of an index). In some embodiments, by scrambling the layout of the objects in memory, an attacker may never be able to determine, by merely looking at the set of cache lines that were touched, what the secret information was.

Figure 2:
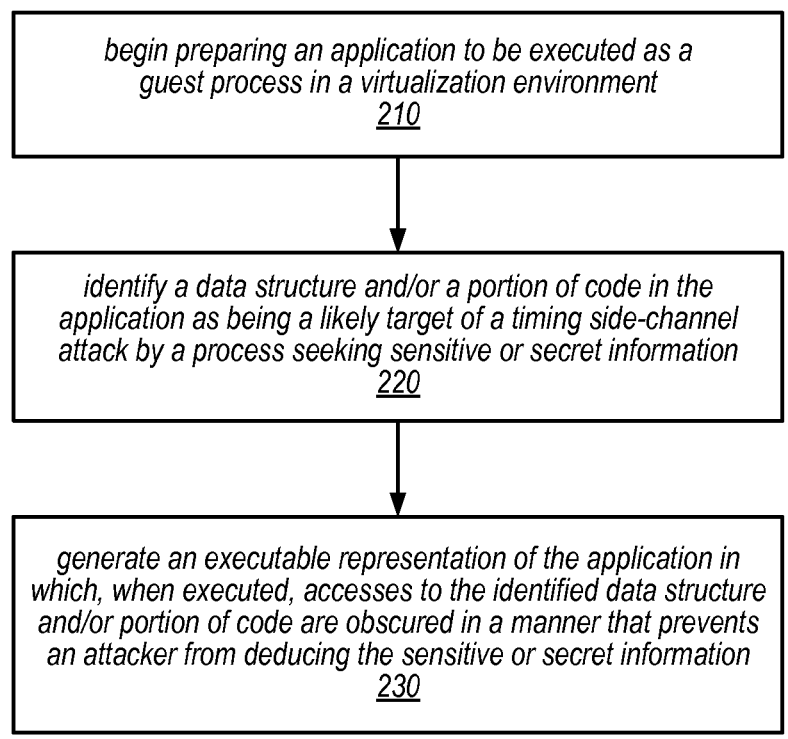
FIG. 2 is a flow diagram illustrating one embodiment of a method for mitigating the information that can be gleaned by timing side-channel attacks by obscuring alternatives in code and data.

One embodiment of a method for mitigating the damage that can be done using timing side-channel attacks (e.g., the information that can be gleaned by such attacks) by obscuring alternatives in code and data is illustrated by the flow diagram in FIG. 2. As illustrated at 210, in this example, the method may include beginning to prepare an application to be executed as a guest process in a virtualization environment. As part of the preparation, the method may include identifying a data structure and/or a portion of code in the application as being a likely target of a timing side-channel attack by a process that is seeking sensitive or secret information, as in 220. AS described in more detail below, the identification may be done manually, using various tools, or using a combination of manual and automatic (programmatic) techniques, in different embodiments.

In response to identifying the potential target(s) of a timing side-channel attack, the method may include generating an executable representation of the application in which, when executed, accesses to the identified data structure and/or portion of code are obscured in a manner that prevents an attacker from deducing the sensitive or secret information, as in 230. In this example, it may not be possible for an attacker to determine that particular critical code paths have been taken merely by observing cache accesses and/or it may not be possible to determine which elements of a data structure that stores sensitive or secret information have been accessed by determining an index into the data structure.

Normally, a code path is laid out more or less linearly in memory by the compiler or programmer (e.g., for simplicity and performance reasons). However, in some embodiments, in order to mitigate the damage caused by timing side-channel attacks, the systems described herein may be configured to interleave the instructions of multiple code paths so that, during execution, instructions from multiple code paths are fetched and cached together on the same cache lines. Rather than applying this technique to all possible code paths or sets of alternative code paths, in some embodiments, this technique may only be applied to code paths that are likely to be targets of a timing side-channel attack or that a client would like to protect from such an attack. In various embodiments, there may be different methods for identifying, designating, and/or marking the critical code paths within a target program. For example, in some embodiments these techniques may only be applied to multiple alternative code paths that follow a conditional expression that is based on secret data.

In some embodiments, critical code path designations may be done by hand by marking specific code areas after manual inspection. For example, in some embodiments, the programmer (or another expert) may manually mark the critical code paths (e.g., using an external marking tool or an interface of the compiler or of a separate analysis tool). In such embodiments, this instrumentation (e.g., these markings) may serve as an instruction or hint to the compiler to apply the techniques described herein to break up the identified alternative code paths such that they will be interleaved into the same cache lines during execution. In another example, in some embodiments, the programmer (or another expert) may manually mark any data objects or data structures that contain sensitive/secret data or that are accessed using an index or offset that is based on a secret. In such embodiments, the compiler (or a separate analysis tool) may perform a data flow analysis to determine the alternative code paths that access those data objects or data structures (e.g., those that include conditional expressions that make use of the sensitive/secret data), may designate them as critical code paths, and may apply the techniques described herein to break up the identified alternative code paths such that they will be interleaved into the same cache lines during execution.

In some embodiments, the compiler (or some other marking and/or analysis tools) may be configured to identify what it assumes to be critical code paths and/or sensitive/secret data objects or data structures based on some heuristics. For example, whenever the compiler (or other tools) detects a conditional expression that controls which of alternative code paths are taken within a function in a certain library (e.g., a library of cryptography functions), the compiler may designate those alternative code paths as critical code paths to which the techniques described herein should be applied. In various embodiments, the compiler (or other tool) may need at least a little bit of information to start this analysis, which may be provided through manual marking by an expert, or by analyzing certain programming patterns. For example, programmers may treat valuable data in a certain way, such as by using a special library function to access them or by putting them into locked/pinned memory (so that it cannot be swapped out). In some embodiments, the compiler (or other tool) may derive an indication that the data and/or the accesses to the data should be protected from timing side-channel attacks, as described herein.

In general, once some initial seeding bits of information are made available (e.g., through manual marking or other instrumentation), a data flow analysis tool may be able to apply expert rules (which may be built up over time) to identify critical code paths and/or sensitive/secret data that should be protected from timing side-channel attacks using one or more of the techniques described herein. Note that, in some embodiments, the rules for designating critical code paths and sensitive/secret data may need to be configurable in order to make trade-offs about which (and how many) of the potential targets of timing side-channel attacks actually need to be addressed using these techniques. For example, since the application of these techniques may negatively impact performance and/or memory usage, there may be trade-offs to be made between the number of potential targets that are most important to address from a security standpoint and the performance hit that can be tolerated when applying these techniques.

In some embodiments, once the critical code paths have been identified, the security techniques described herein may be applied to them. For example, to apply these cache line interleaving techniques, the sequence of instructions within each of the alternative code paths may be broken up into sub-cache-line-length segments (or chunks) such that at least one instruction (or an atomic portion thereof, e.g., one byte of an instruction) from each of the alternative code segments resides in (or will be fetched into) each of the cache lines of a set of cache lines that include the code for those paths. In some embodiments, this transformation may be performed manually (e.g., by handcrafting assembly code). In other embodiments, this transformation may be performed with the support of the compiler or other tools, e.g., by modifying, marking, or instrumenting a high-level programming language representation of the code and then invoking the compiler and/or other tools to generate an executable representation of the application in which, when executed, accesses to the identified data structures and/or critical code paths are obscured in a manner that prevents an attacker from deducing the sensitive or secret information.

In some embodiments, each of the individual critical code paths may be divided into small pieces (e.g., chunks of code that are roughly smaller than half of a cache line, or having an upper bound that is less than the length of one or two cache lines) and pieces of the two alternatives may be interleaved. In some embodiments, the individual critical code paths may be divided into much smaller pieces, such that at least some individual cache lines include multiple chunks of code from at least one (or potentially both) of the critical code paths. As previously noted, in some embodiments, the individual code pieces (chunks) of a given critical code path that are distributed across different portions of a single cache line or on different cache lines may be concatenated by small local jump instructions (instructions that jump over the instructions of the alternate path), so that the logical program flow remains unchanged. Note that, in the case of an instruction (or a chunk of code) that spans two cache lines, the bytes that make up the instruction must typically be located in contiguous locations in the virtual address space (e.g., on immediately adjacent cache lines). In various embodiments, each of the alternative code paths may be allocated the same number of bytes within each cache line or different numbers of bytes within each cache line (which may be the same or different numbers of bytes on different cache lines). In some embodiments, allocation locations within a cache line that are unused by one of the alternative code paths (e.g., if one is longer than the other) may be filled with no-operation (NOP) type instructions. In some embodiments, if the alternative code paths are very short (e.g., if they fit together in one cache line), it may not be necessary to interleave the instructions of the alternative code paths on the cache line. However, one or more jump instructions may be needed to jump over the instructions of the alternative code paths.

In various embodiments, the transformations described herein may be applied to sub-parts of functions (e.g., to alternative code paths in "if" statements in which the conditional expression contains sensitive/secret data), may be used to mix the instructions of two functions, or may be applied on a case-by-case basis on a copy of in-lined functions. The alternative code paths to which it may be suitable to apply these techniques may, in general, be of somewhat similar complexity and/or small size. Note that while several examples included herein describe these security techniques in terms of two alternative code paths, in other embodiments they may also be applied to more than two alternatives, as long as chunks of code from all of the alternatives can fit into single cache lines. In various embodiments, the techniques described herein for merging multiple code paths onto the same cache lines may prevent an attacker from gaining sensitive/secret information by observing cache residency, since alternative code paths will have exactly the same cache footprint.

Figure 3:
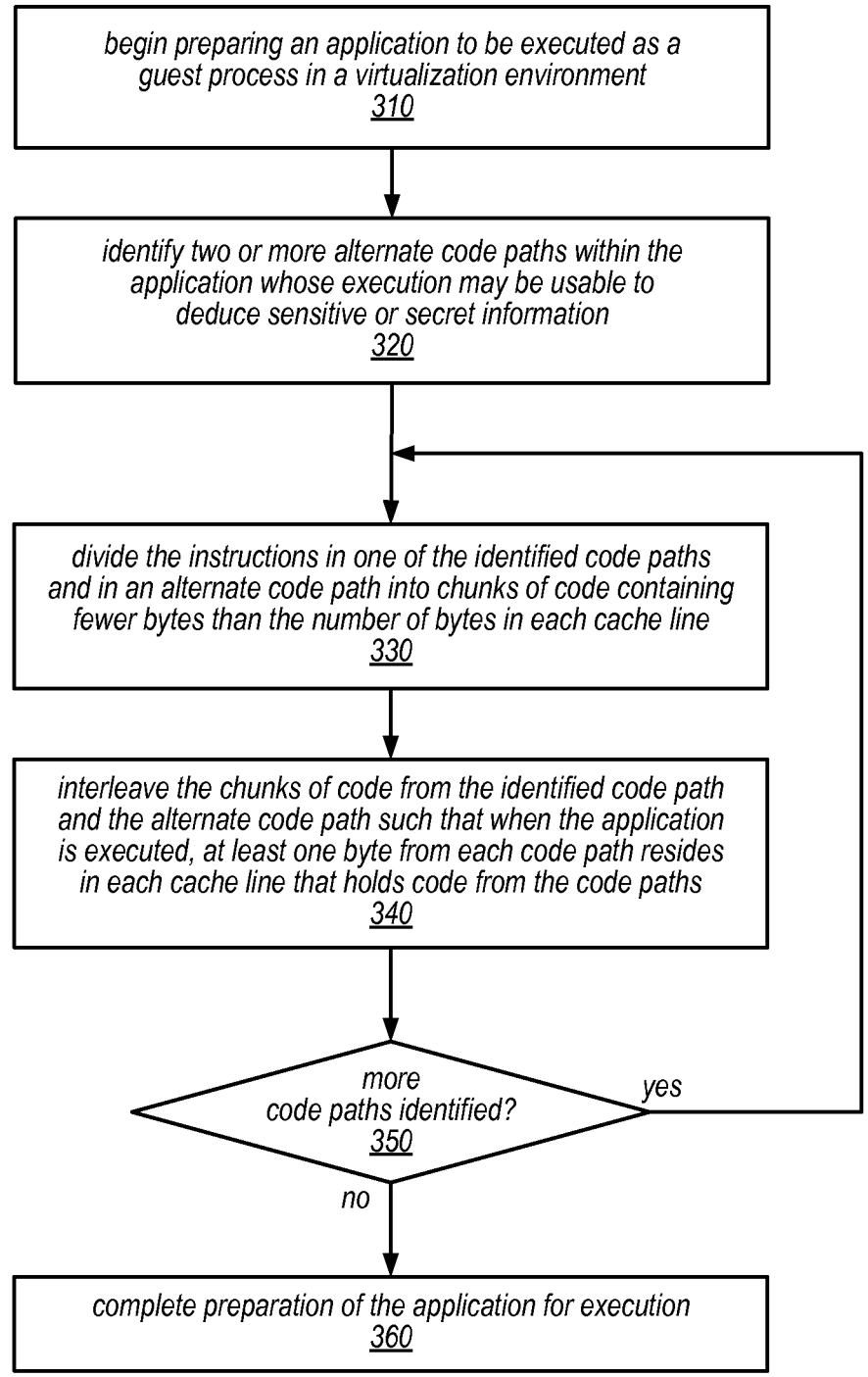
FIG. 3 is a flow diagram illustrating one embodiment of a method for preparing and executing the code of a guest process in a manner that prevents attackers from determining which of alternative code paths are taken during execution.

One embodiment of a method for preparing and executing the code of a guest process in a manner that prevents attackers from determining which of alternative code paths are taken during execution is illustrated by the flow diagram in FIG. 3. As illustrated at 310, in this example, the method may include beginning preparation of an application to be executed as a guest process in a virtualization environment. The method may include identifying two or more code paths within the application whose execution (if detected) may be usable to deduce sensitive or secret information, as in 320. For example, the method may include identifying pairs or larger collections of alternative code paths that are selected at runtime for execution using on a conditional expression that is based on sensitive or secret information. In various embodiments, these critical code paths may be marked (e.g., manually by the programmer or another expert), may be determined through static analysis (e.g., by determining that they are, or that they call, functions of an encryption library or other sensitive/secret functions), may be determined using data flow analysis (e.g., by determining that they access data that has been marked as, or determined to be, sensitive/secret), or may be identified using other techniques. In some embodiments, the critical code paths may be marked using an editor or other marking interface of the compiler (or of a security component thereof) or of a separate analysis tool.

As illustrated in this example, the method may include dividing the instructions in one of the identified critical code paths and in an alternate code path (which may also be one of the identified critical code paths) into chunks of code containing fewer bytes than the number of bytes in each cache line, as in 330. The method may include interleaving the chunks of code from the identified critical code path and the alternate code path such that when the application is executed, at least one byte from each of these code paths resides in each cache line that holds bytes of the instructions from the code paths, as in 340. In other words, each cache line that holds any bytes of code from either the identified critical code path or the alternate code path holds at least one byte from each of them. Note that in different embodiments, this technique for distributing the code from multiple code paths into cache lines by interleaving them (or for modifying a distribution code distribution that was generated using standard techniques) may be applied at the source code level (e.g., in a high-level programming language or assembly language representation of the application) or in a native-code (e.g., binary code) representation of the application, and may be performed by the compiler (or by a security component thereof), by a separate analysis tool, or through a post-processing operation (as described below).

If more code paths within the application whose execution may be usable to deduce sensitive or secret information have been identified, the method may include repeating the operations shown in 330 and 340 for each of the critical code paths (or collections of alternative code paths) so identified. This is illustrated in FIG. 3 by the feedback from the positive exit of 350 to 330. Once all of the critical code paths within the application whose execution may be usable to deduce sensitive or secret information have been identified, and the security measures described herein have been taken for all of them (shown as the negative exit from 350), the method may include completing the preparation of the application for execution, as in 360. This may include finishing the compilation of the application, applying the techniques described below for scrambling sensitive/secret data that is accessed by the application, linking the executable representations of the application and the functions it calls, performing post-processing operations, and/or performing other tasks, in different embodiments.

In typical systems, cache lines are usually longer than two instructions. For example, in some systems (e.g., in some x86 systems), each cache line is 64 bytes wide, the maximum width of a single instruction is 15 bytes, and a local relative jump instruction is two bytes wide. In such systems, in the worst case, three full alternative paths could be encoded in each cache line, including jump instructions. Note, however, that making code more non-linear by breaking into shorter chunks may reduce performance and increase overhead (e.g., the memory and cache footprints) due to adding jump instructions between at least some of the original instructions.

As previously noted, for pairs of critical code paths of different lengths, the shorter path may be filled up with NOP type instructions, such that both alternative paths go through the exact same sequence of cache lines. In addition, it may be possible to make memory size adjustments in-between a pair of critical code paths to adjust for smaller path length differences. As previously noted both critical code paths in a pair may not have to receive the exact same allocation of bytes within each cache line, as long as each cache lines contains at least a part of an instruction from each of the alternative code paths. In some embodiments, the critical code paths may be broken up into chunks asymmetrically cut the paths. For example, the longest path may be broken up into larger chunks and may be allocated a larger number of bytes in each cache line, while the smaller path may be broken up into smaller chunks and may be allocated fewer bytes in each cache line. Note also that, since the instructions themselves may be of different lengths, different numbers of instructions from each code path may reside on a single cache line, regardless of whether the code paths are allocated the same number of bytes.

Note that while the techniques described above may increase the size of the code and also negatively impact performance, the size increase may not be very large when compared with the size of the application as a whole. For example, in a typical program that is multiple megabytes, the critical code paths and sensitive/secret data structures to which these techniques are applied may be relatively small compared to the size of the overall program and may not be increased by very much. On the other hand, the performance (the execution time) may take a bigger hit due to the application of these techniques. For example, the types of cryptography functions to which they may be applied typically process a lot of code. In other words, in at least some situations (e.g., if the application is configured to handle a complete stream of data that has to be encrypted or decrypted), the amount of code that is affected may be very small, but it may be running all the time. In such cases, even a small reduction in performance for the individual cryptography functions may be magnified in the overall application. Again, in various embodiments, different trade-offs may be made between the benefits of added security and the negative impacts on performance and memory size (including in terms of the size of the cache working set). In general, transforming code in the manner described herein way may slow down its execution considerably as the code would no longer be laid out linearly and because a larger cache-working set would be required. Those effects may or may not be significant for specific applications and/or for particular hardware architectures.

In some embodiments, instead of always (e.g., statically) aligning one code path with the beginning of each cache line, the systems described herein may alternate the order of the code path chunks so that larger contiguous chunks of code on a single code path span two neighboring cache lines. For example, code path A may be assigned bytes at the end of one cache line and at the beginning of the next cache line, and these bytes may be filled with instructions from a single chunk of code from path A or with instructions from two adjacent chunks of code from path A, in different embodiments. This approach may, in some embodiments, save one connecting jump instruction per cache line, and may reduce fragmentation overhead at cache line boundaries. Using this approach, no connecting jump instruction is required between cache-line transitions, and space and runtime overhead may be reduced. In this example, only one connecting jump instruction may be required per cache line for alternating between path A and an alternate path B. In embodiments in which each cache line includes 64 bytes, this approach may limits the size overhead to 2 bytes/64 bytes, or roughly 3.125 percent. Note also that the exact split point between the bytes allocated to code path A and those allocated to code path B does not have to be static, but could be adapted for each cache line. The only requirement may be that each code path occupies at least one byte in each cache line of the merged path.

Figure 4A:
FIGS. 4A-4D illustrate examples of the placement of instructions fetched from memory for alternative code paths into various cache lines, according to at least some embodiments.

FIGS. 4A-4D illustrate examples of the placement of instructions fetched from memory for alternative code paths into various cache lines, according to at least some embodiments. More specifically, FIG. 4A illustrates two critical code paths that have been fetched into a cache in a system that does not employ the security techniques described herein. In this example, instructions making up one of the critical code paths (code path A) span two cache lines (e.g., cache lines 400 and 402, which are 64 bytes wide), and instructions making up the other critical code path (code path B) span only one cache line (e.g., cache line 404, which is also 64 bytes wide). Note that different ones of the instructions included in either of the code paths may have different lengths, and they may, in some cases, cross cache line boundaries (not shown). In this example, the entry point of code path A is aligned with the beginning of cache line 400 (shown as position 401), and cache line 400 includes bytes representing instructions A1-A9 (which collectively include 64 bytes). Instructions making up the rest of code path A (e.g., instructions A10-A17, which collectively include another 64 bytes) continue on cache line 402, where the last instruction for code path A (instruction A17) is shown at the end of cache line 402 (at position 403). In this example, the entry point of code path B is aligned with the beginning of cache line 404 (shown as position 405), and cache line 404 includes bytes representing instructions B1-B19 (which collectively include 64 bytes).

Figure 4B:
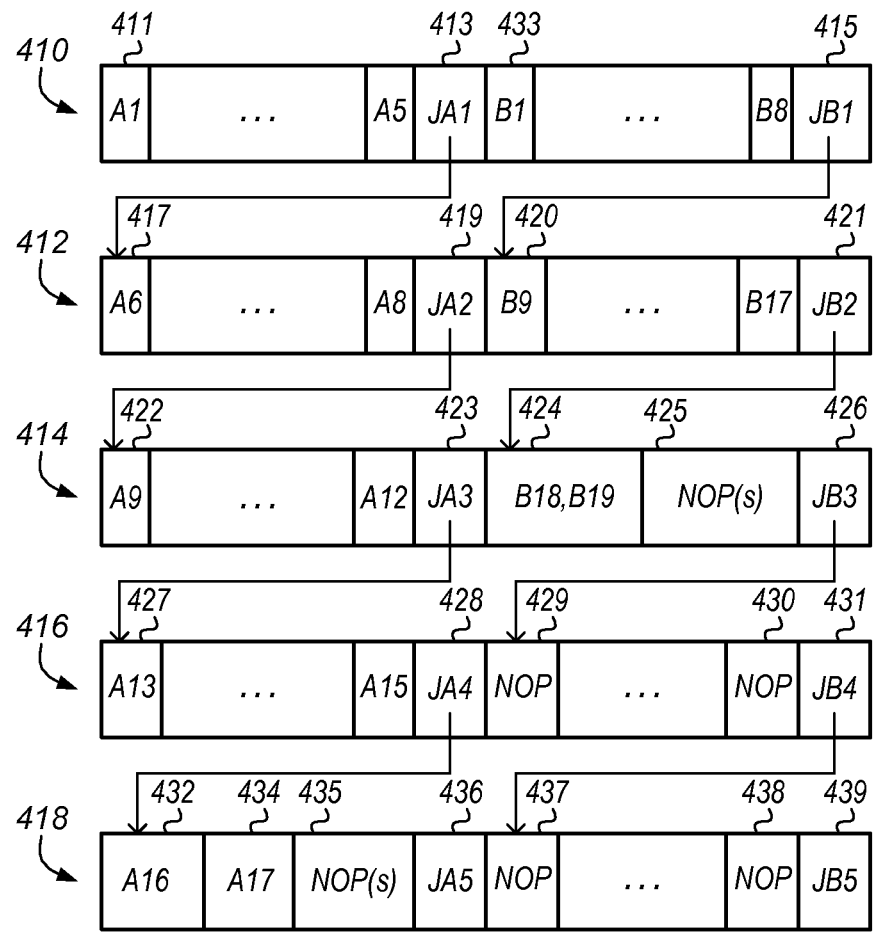

FIG. 4B illustrates an example in which the instructions representing critical code paths A and B (i.e., the same critical code paths illustrated in FIG. 4A) are interleaved on the same cache lines. In this example, each code path is allocated the same number of bytes in each cache line, including bytes representing the jump instructions that link the chunks of each of the code paths on different cache lines to each other, and the respective code paths are padded with no-operation (NOP) type instructions to fill any unused bytes that are allocated to them. In this example, the entry point for code path A is aligned with the beginning of cache line 410 (at position 411), and the first chunk of instructions for code path A (shown as instructions A1-A5) resides on cache line 410, followed by a first jump instruction for code path A (instruction JA1, shown at position 413) that allows execution of code path A to continue at the beginning of cache line 412 (with instruction A6 at position 417). In this example, the entry point for code path B is aligned with the middle of cache line 410 (at position 433), and the first chunk of instructions for code path B (shown as instructions B1-B8) resides on cache line 410, followed by a first jump instruction for code path B (instruction JB1, shown at position 415) that allows execution of code path B to continue in the middle of cache line 412 (with instruction B9 at position 420). The layout of instructions in cache line 412 is similar to that of cache line 410, and includes instructions A6-A8 of code path A (followed by jump instruction JA2 at position 419, which allows execution of code path A to continue with instruction A9 at position 422 on cache line 414), and instructions B9-B17 of code path B (followed by jump instruction JB2 at position 421), which allows execution of code path B to continue with instruction B18 at position 424 on cache line 414.

As illustrated in FIG. 4B, while the instructions making up code path A continue on cache lines 414, 416, and 418, only two instructions remain for code path B following those residing on cache line 412. For example, instructions A9-A12 of code path A continue on cache line 414 (beginning at position 422), followed by a jump instruction for code path A (shown as instruction JA3 at position 423). Instructions B18 and B19 of code path B continue on cache line 414 (beginning at position 424), but do not fill all of the bytes of cache line 414 that are allocated for code path B. Therefore, in this example, instructions B18-B19 are followed by one or more NOP type instructions (enough to fill the remaining allocation of bytes beginning at position 425) prior to the jump instruction for code path B (shown as instruction JB3 at position 426). Note that in other embodiments, NOP type instructions used to pad the allocation of bytes for a particular code path may be placed after the corresponding jump instruction, rather than before the jump instruction.

As illustrated in FIG. 4B, instructions A13-A15 of code path A continue on cache line 416 beginning at position 427, followed by a jump instruction for code path A (shown as instruction JA4 at position 428). The remaining instructions of code path A (e.g., instructions A16-A17) continue on cache line 418 (at positions 432 and 434) and, since they do not fill all of the bytes allocated to code path A, are followed by one or more NOP type instructions (beginning at position 435) and a final jump instruction JA5 (shown at position 436). In this example, since there are no additional instructions to fetch into the cache for code path B, the jump instructions JB3 (shown at position 426 on cache line 414) and JB4 (shown at position 431 on cache line 416), which merely lead to NOP type instructions (beginning at positions 429 and 437 on cache lines 416 and 418, respectively and ending at positions 430 and 438), may be considered empty jumps. In other words, these jump instructions may not lead to functional code and may be included only so that code path B passes through the same cache lines as code path A (even though the instructions making up code path A include twice as many bytes as those making up code path B).

Note that jump instructions JA5 (at position 436 on cache line 418) and/or JB5 (at position 439 on cache line 418) may or may not be necessary to include in code paths A and B, in different embodiments (e.g., depending on the code at the end of each code path and/or the code that follows them).

Figure 4C:
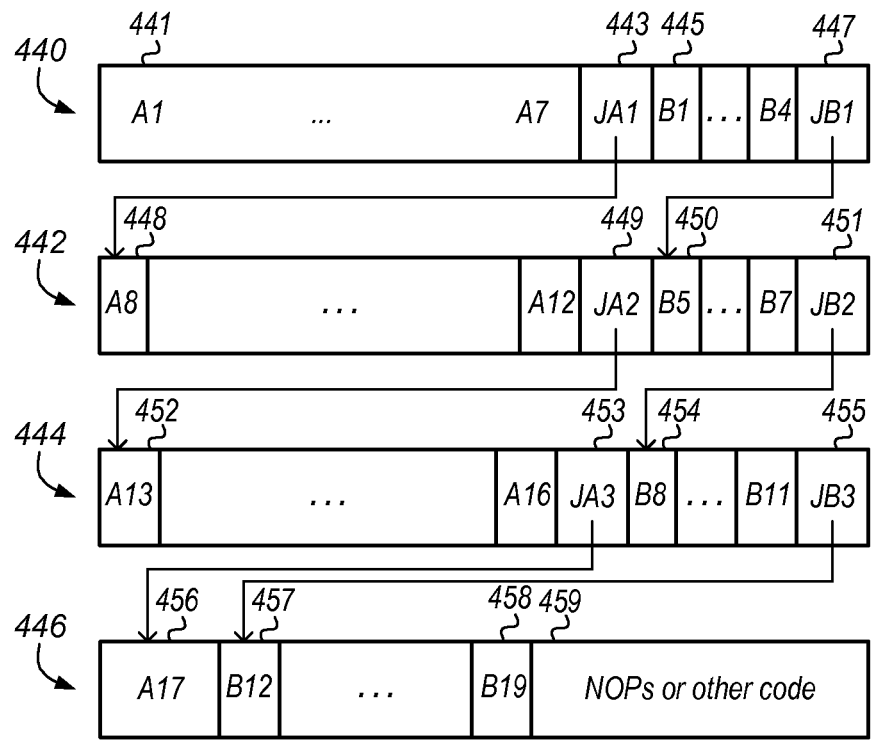

FIG. 4C illustrates another example in which the instructions representing critical code paths A and B (i.e., the same critical code paths illustrated in FIG. 4A) are interleaved on the same cache lines. In this example, different numbers of bytes are allocated to the two critical code paths in at least some of the cache lines, along with bytes representing the jump instructions that link the chunks of each of the code paths on different cache lines to each other, and the respective code paths are padded with no-operation (NOP) type instructions to fill any unused bytes that are allocated to them. In this example, the entry point for code path A is aligned with the beginning of cache line 440 (at position 441), and the first chunk of instructions for code path A (shown as instructions A1-A7) resides on cache line 440, followed by a first jump instruction for code path A (instruction JA1, shown at position 443) that allows execution of code path A to continue at the beginning of cache line 442 (with instruction A8 at position 448). In this example, the entry point for code path B is not aligned with the middle of cache line 440, since code path B is allocated fewer bytes on cache line 440 than code path A. Here, the entry point for code path B is at position 445, and the first chunk of instructions for code path B (shown as instructions B1-B4) resides on cache line 440, followed by a first jump instruction for code path B (instruction JB1, shown at position 447) that allows execution of code path B to continue with instruction B5 at position 450 on cache line 442.

The layout of instructions in cache line 442 is similar to that of cache line 440, and includes instructions A8-A12 of code path A (followed by jump instruction JA2 at position 449, which allows execution of code path A to continue at the beginning of cache line 444 with instruction A13 at position 452), and instructions B5-B7 of code path B (followed by jump instruction JB2 at position 451), which allows execution of code path B to continue with instruction B8 at position 454 on cache line 444. In cache line 442, code path B has again been allocated fewer bytes than code path A. The layout of instructions in cache line 444 is also similar to that of cache line 440, and includes instructions A13-A16 of code path A (followed by jump instruction JA3 at position 453, which allows execution of code path A to continue with instruction A17 at position 456 at the beginning of cache line 446), and instructions B8-B11 of code path B (followed by jump instruction JB3 at position 455), which allows execution of code path B to continue with instruction B12 at position 457 on cache line 446. As illustrated in FIG. 4C, code path A has been allocated fewer bytes than code path B on cache line 446 (e.g., only enough for a single instruction, A17, rather than the number of bytes needed for instructions B12-B19 of code path B). In this example, since there are no additional instructions from either code path A or code path B, the remaining bytes of cache line 446 (those following the last bytes of code path B at position 458) may filled with NOP type instructions or with other code of the application, beginning at position 459. Note that, in this example, the number of bytes allocated to each code path differed between cache lines. However, in other embodiments, the allocation of bytes to each code path (whether they are the same or different for the code paths) may be the same on all of the affected cache lines.

Figure 4D:
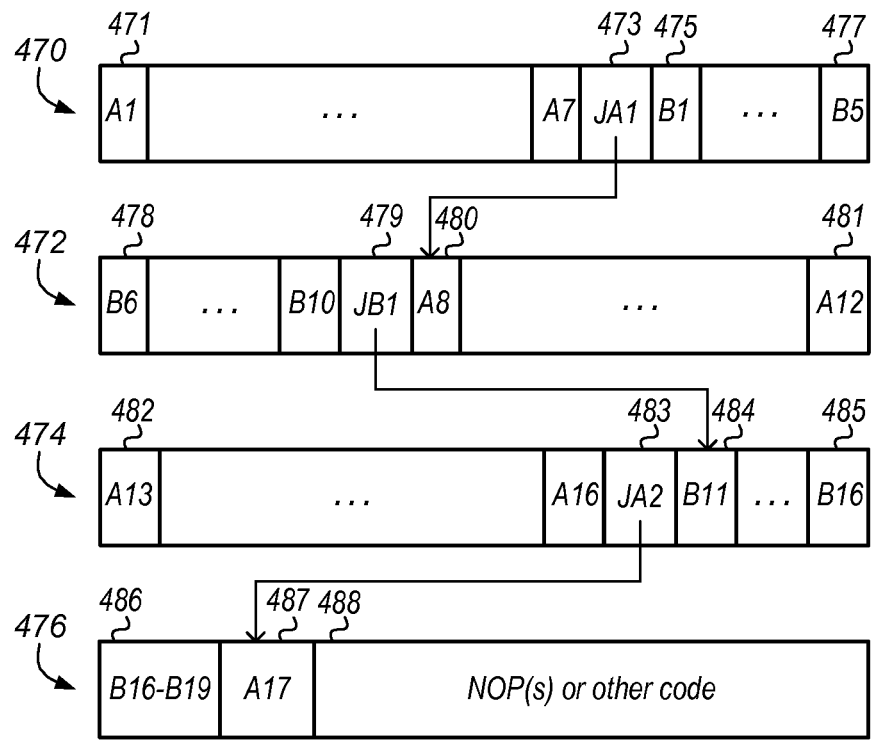

FIG. 4D illustrates yet another example in which the instructions representing critical code paths A and B (i.e., the same critical code paths illustrated in FIG. 4A) are interleaved on the same cache lines. In this example, the optimization described above (in which the number of jump instructions is reduced by allowing some, if not most, of the chunks of code for a given critical code path to span two cache lines) has been applied to the distribution and layout of code chunks from code path A and code path B in the cache. In this example, different numbers of bytes are allocated to the two critical code paths in at least some of the cache lines. However, because longer chunks (or consecutive chunks) of code from a single code path are placed such that they span two of the cache lines, not all of the cache lines include a jump instruction for each of the code paths to connect the instructions between cache lines. In this example, the entry point for code path A is aligned with the beginning of cache line 470 (at position 471), and the first chunk of instructions for code path A (shown as instructions A1-A7) resides on cache line 470. This chunk is followed by a first jump instruction for code path A (instruction JA1, shown at position 473) that allows execution of code path A to continue with instruction A8 at position 480 on cache line 472). In this example, the entry point for code path B is not aligned with the middle of cache line 470. Here, the entry point for code path B is at position 475 in cache line 470, and the first chunk of instructions for code path B includes instructions B1-B5 in cache line 470. In this example, following instruction B5 at position 477 in cache line 470, the first chunk of instructions for code path B and continues with instructions B6-B10 beginning at position 478 on cache line 472. This chunk is followed by a first jump instruction for code path B (instruction JB1, shown at position 479 on cache line 472) that allows execution of code path B to continue with instruction B11 at position 484 on cache line 474.

Cache line 472 also includes (beginning at position 480) instructions A8-A12 of the second chunk of code path A, which, following instruction A12 at position 481 in cache line 472, also includes instructions A13-A16 on cache line 474 (beginning at position 482). This chunk is followed by jump instruction JA2 (at position 483 on cache line 474), which allows execution of code path A to continue with instruction A11 at position 487 on cache line 476). Cache line 474 also includes (beginning at position 484) instructions B11-B16 of the second chunk of code path B, which, following instruction B16 at position 485 in cache line 474, also includes instructions B16-B19 on cache line 476 (beginning at position 486). This chunk is followed by the single remaining instruction of code path A (instruction A17 at position 487). In this example, since there are no additional instructions from either code path A or code path B, the remaining bytes of cache line 476 (those following the last bytes of code path A) may filled with one or more NOP type instructions or with other code of the application, beginning at position 488. In this example, since fewer jump instructions were needed to link chunks of the two code paths (e.g., only three jump instructions rather than the six included in the example illustrated in FIG. 4C), there are more unused bytes in cache line 476 of FIG. 4D than in cache line 446 of FIG. 4C (e.g., bytes that may be allocated to other purposes, in some embodiments). In other words, the application of the optimization described above served to reduce the cache footprint of code paths A and B while still placing data in the cache in a manner that obscures accesses to a particular one of these code paths. Note that, in this example, the number of bytes allocated to each code path differed between cache lines. However, in other embodiments, the allocation of bytes to each code path (whether they are the same or different for the code paths) may be the same on all of the affected cache lines.

As previously noted, in some embodiments, the systems described herein may apply a similar approach to obscure accesses to data objects (or specific elements thereof) to prevent the discovery of sensitive/secret information by timing side-channel attacks. However, there is typically no natural concept of alternative pairing. Instead, attackers may monitor timing for accesses into lookup tables or other data structures (e.g., indexed data structures) and deduce indices from that. For example, in an application in which a cryptography function (e.g., a function of a cryptography library) uses a pre-computed table indexed by an initial key, the attacker may attempt to monitor the index into the table to deduce bits of the initial key. In another example, by detecting accesses to different instances of a data object, an attacker may gain knowledge of sensitive/secret information.

In some embodiments, such attacks may be mitigated by scrambling the layout of the objects in memory so that an attacker may never be able to determine, by merely looking at the set of cache lines that were touched, what the secret information was. For example, in some embodiments, a non-standard (and unpredictable) address translation function (e.g., a mixing access function) may be employed that distributes the actual data over many cache lines in an unpredictable manner. The address translation function may be used to transform memory addresses that are used to lookup data from critical data objects (e.g., those from which sensitive/secret information can be deduced by monitoring indexed lookups). In some embodiments, a generic memory-access function may be introduced by the compiler automatically (or by the programmer manually) to access critical data, and that access function may (internally) encapsulate the transformation. In some embodiments, the compiler may generate indirect memory accesses for all data that is marked critical, while in other embodiments the programmer may make use of that function manually.

The data layout (and/or the address translation function itself) may be initialized dynamically (e.g., at program start), and may be re-initialized (to re-scramble the data) during execution (e.g., at predetermined timed intervals or based on a threshold on the usage of the data in terms of the number or rate of accesses to the data), in different embodiments. In some embodiments, the address translation function that is applied in this manner may work below cache-line granularity in order to achieve a cache-line mixing effect (in additional to the scrambling effect of the translation function itself). In some such embodiments, the granularity at which the scrambling of data takes place may be configurable (e.g., statically, by setting a value in the code, or dynamically, during runtime). For example, in some embodiments, the scrambling may be performed at byte granularity (such that distinct bytes are distributed to different, unpredictable location) by hiding the data behind a byte access function. In other embodiments, the scrambling may be performed at the word level, by double-word level, by quad-word, or by a portion of the cache line width (e.g., by quarter cache line or half cache line). In one example, the address translation function may always map eight contiguous bytes linearly and would, therefore, only need to perform one translation per quad-word access. In another example, the application of the address translation function at the byte level may cause what would have been a single 8-byte access to be divided into eight distinct byte accesses which would land in different cache lines, e.g., byte 0 could be mapped to offset 14, and byte 1 could be mapped to offset 1020. Note that, with any of these mapping functions, there may be a requirement that there is a unique location for each of the bytes, so that there are not any collisions at runtime.

In some embodiments of the systems described herein, the address translation function may be an arbitrary function that is introduced into the code that accessed the sensitive/secret data objects or table. In some embodiments, it may be included in a library of utility functions or security functions. In some embodiments, e.g., in order to offer better protection from timing side-channel attacks, the nature of the function may itself be a secret. In some embodiments, it may involve a non-trivial translation function, so that it would not be easy to determine or predict the function by merely observing the offsets by the cache lines to the original untranslated index. For example, it may be dependent on an arbitrary or random parameter. In some embodiments, the parameter value may be chosen at runtime from a random pool, so that there is no trace of it in the code itself (e.g., in a library package through which the function may be distributed) and so that no information can be determined by static analysis. As noted above, the address translation function may be parameterized during an initialization operation (at program start) and may be re-parameterized during runtime, in some embodiments. In such embodiments, critical data objects may be initially encoded using the parameter value selected at program start, and may be re-encoded by reading them using the old parameter value and then writing them back using a new parameter value. In some embodiments, all accesses to data objects or data structures that have been marked or otherwise designated as being potential targets of a timing side-channel attack (e.g., sensitive or secret data objects or structures) may be accessed through the translation function (e.g., through special access operations that employ the translation function). As previously noted, the marking or identification of sensitive/secret data objects and structures may be performed manually (e.g., by the programmer or another export) or may be performed programmatically (e.g., by the compiler or by various analysis tools, based on hints given in the program and/or by heuristics or expert rules). In some embodiments, an external tool may insert the scrambling translation function (or apply it to compiled code) as a post-processing operation.

In various embodiments, the approach described herein for obscuring accesses to sensitive/secret data may be applied to scramble the in-memory layout of single data structures (e.g., a single table) or to mix several existing instances of a data object or data structure (e.g., to merge the data from multiple tables). The address translation function may be required to map a specific input range to an output range of at least the same size and must never produce overlapping output for a distinct input (isomorphic). As with the approach described above for interleaving multiple alternative code paths in the same cache lines, applying a non-standard address translation function to at least some of the accesses in an application (e.g., translating data accesses through such a transformation function) may also slow down computation, and may negatively impact the performance of the application as a whole. Therefore, trade-offs may be made about which, and how many data objects or data structures should be protected using this approach, e.g., applying it only to protect data objects or data structures that are highly likely to be targets of a timing side-channel attack or for which exposure of the data (or indices into the object or structure) could lead to an attacker determining sensitive/secret information.

Figure 5:
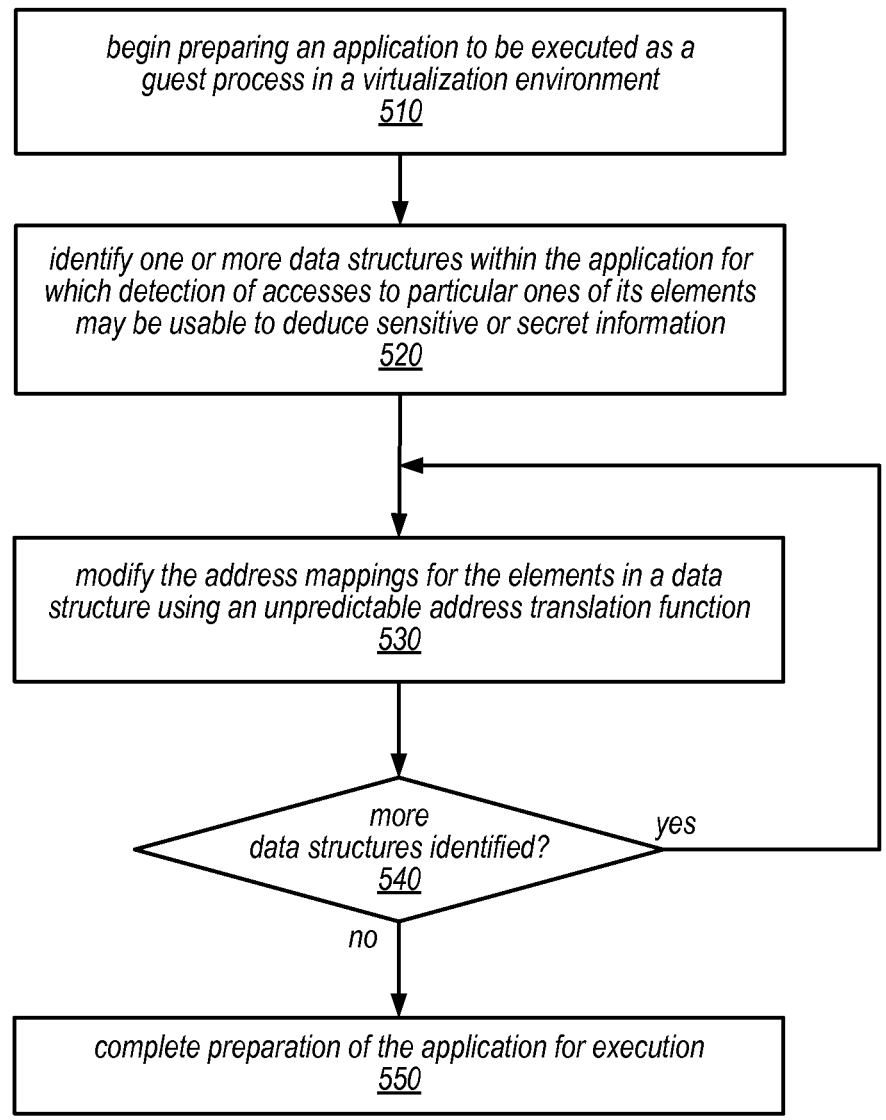
FIG. 5 is a flow diagram illustrating one embodiment of a method for preparing and executing the code of a guest process in a manner that prevents attackers from determining that particular sensitive data elements are accessed.

FIG. 5 is a flow diagram illustrating one embodiment of a method for preparing and executing the code of a guest process in a manner that prevents attackers from determining that particular sensitive data elements are accessed. As illustrated at 510, in this example, the method may include beginning preparation of an application to be executed as a guest process in a virtualization environment. The method may include identifying one or more data structures within the application for which detection of accesses to particular ones of its elements may be usable to deduce sensitive or secret information, as in 520. For example, in various embodiments, sensitive/secret data may be marked (e.g., manually by the programmer or another expert), may be determined through static analysis (e.g., by determining that they are accessed by functions of an encryption library, by other sensitive/secret functions, or by special access operations that are inserted by the programmer to treat sensitive/secret data differently than other data), or may be identified using other techniques. In some embodiments, the sensitive/secret data may be marked using an editor or other marking interface of the compiler (or of a security component thereof) or of a separate analysis tool.

As illustrated in this example, the method may include modifying the address mappings for the elements in a data structure using an unpredictable address translation function, as in 530. In various embodiments, this may include applying a non-standard mapping function when compiling the application, inserting a parameterized mapping function into the application to be initialized at runtime, inserting a parameterized mapping function into the application to be called multiple times during execution, and/or replacing accesses to the data structure with calls to library functions that use a non-standard mapping function, any of which may lead to distributing various data elements into (or accessing various data elements of) the data structure using non-standard indexing. Note that, in some embodiments, this may include merging two or more identified data structures and interleaving the elements of the two data structures, in addition to (or instead of) applying a non-standard mapping function to the addresses of their constituent data elements.

If more data structures within the application for which detection of accesses to particular ones of its elements may be usable to deduce sensitive or secret information have been identified, the method may include repeating the operations shown in 530 for each of these data structures (or for various collections of data structures that are merged to further obscure accesses to their constituent data elements). This is illustrated in FIG. 5 by the feedback from the positive exit of 540 to 530. Once all of the data structures within the application for which detection of accesses to particular ones of its elements may be usable to deduce sensitive or secret information have been identified, and the security measures described herein have been taken for all of them (shown as the negative exit from 540), the method may include completing the preparation of the application for execution, as in 550. This may include finishing the compilation of the application, linking the executable representations of the application and the functions it calls, performing post-processing operations, and/or performing other tasks, in different embodiments. In some embodiments, it may also include applying the techniques illustrated in FIG. 3 and described herein for obscuring the execution of critical code paths that access the identified data structures.

FIGS. 6A-6B and 7A-7B illustrate examples of the application of non-standard (and unpredictable) address translation functions to scramble sensitive or secret table data, according to at least some embodiments. For example, FIG. 6A illustrates a single table whose 1024 data elements are accessed using a standard mapping function (e.g., an address translation function in which the indices into the table used for accessing the data elements stored in the table are in the same order as the data elements themselves). In other words, the layout of the table data is in numerical order according to the corresponding index value. As illustrated in this example, data element 0 (shown as element 610) resides in the first position within table 600 and is accessed using index 0, data element 1 (shown as element 611) resides in the second position within table 600 and is accessed using index 1, and so on, for elements 612, 613, 625, and 626.

FIG. 6B illustrates the same table when its elements have been scrambled (and are subsequently accessed) using a non-standard (and unpredictable) address translation function (e.g., one in which the data elements stored in the table are not in the same order as the indices into the table used to access them). In other words, the layout of the table data is in an order other than a numerical order according to the corresponding index value (e.g., in a pseudo-random or permuted order, according to a parameterized address translation function). As illustrated in this example, data element 117 (shown as element 661) resides in the first position within table 650 and is accessed using index 0, data element 946 (shown as element 662) resides in the second position within table 650 and is accessed using index 1, data element 2 (shown as element 663) resides in the third position within table 650 and is accessed using index 2, data element 1003 (shown as element 664) resides in the fourth position within table 650 and is accessed using index 3, data element 425 (shown as element 675) resides in the next-to-last position within table 650 and is accessed using index 1022, data element 28 (shown as element 676) resides in the last position within table 650 and is accessed using index 1023.

FIG. 7A illustrates two tables whose elements are accessed using a standard mapping function (e.g., an address translation function in which the indices into the tables used for accessing the data elements stored in the tables are in the same order as the data elements themselves). In other words, the layout of the data elements in each table is in numerical order according to the corresponding index value. In this example, table 700 includes 256 data elements and table 720 includes 512 data elements. As illustrated in this example, data element A0 in table 700 (shown as element 710) resides in the first position within table 700 and is accessed using index 0, data element A1 (shown as element 711) resides in the second position within table 700 and is accessed using index 1, and data element A255 (shown as element 720) resides in the last element in table 700 and is accessed using index 255. Similarly, data element B0 in table 720 (shown as element 740) resides in the first position within table 720 and is accessed using index 0, data element B1 (shown as element 741) resides in the second position within table 720 and is accessed using index 1, and data element B511

(shown as element 750) resides in the last element in table 720 and is accessed using index 511.

FIG. 7B illustrates a single table (containing 768 data elements) into which the two tables illustrated in FIG. 7A have been merged and to which a non-standard (and unpredictable) address translation function has been applied to the combined set of data elements from the two original tables (e.g., one in which the data elements stored in the table are not in the same order as the indices into the table used to access them). Note that, in this example, in addition to scrambling the layout of the data within each of the original tables, elements of the two original tables are interleaved in the merged table. For example, data element A123 (shown as element 761) resides in the first position within table 760 and is accessed using index 0, data element B6 (shown as element 762) resides in the second position within table 760 and is accessed using index 1, data element B432 (shown as element 763) resides in the third position within table 760 and is accessed using index 2, data element A12 (shown as element 764) resides in the fourth position within table 760 and is accessed using index 3, data element B203 (shown as element 771) resides in the second-to-last position within table 760 and is accessed using index 765, data element A245 (shown as element 772) resides in the next-to-last position within table 760 and is accessed using index 766, and data element B84 (shown as element 773) resides in the last element in table 760 and is accessed using index 767.

Note that, in various embodiments, the security techniques described herein may be implemented by (or with support from) one or more of: a marking component, a data flow analysis tool, a compiler, an external analysis tool or security component, or a post-processor. For example, in some embodiments, after marking (or otherwise instrumenting) critical code paths and/or sensitive/secret data of an application (e.g., manually or using one or more of these components), the compiler may generate an executable representation of the application that does not include the transformations in the code or data structures described above. Instead, these transformations may be made by a post-processing component (e.g., a post-processor that is configured to interleave critical code paths or and/or scramble data in sensitive/secret data object(s) using a non-standard and unpredictable address translation function).

Figure 8:
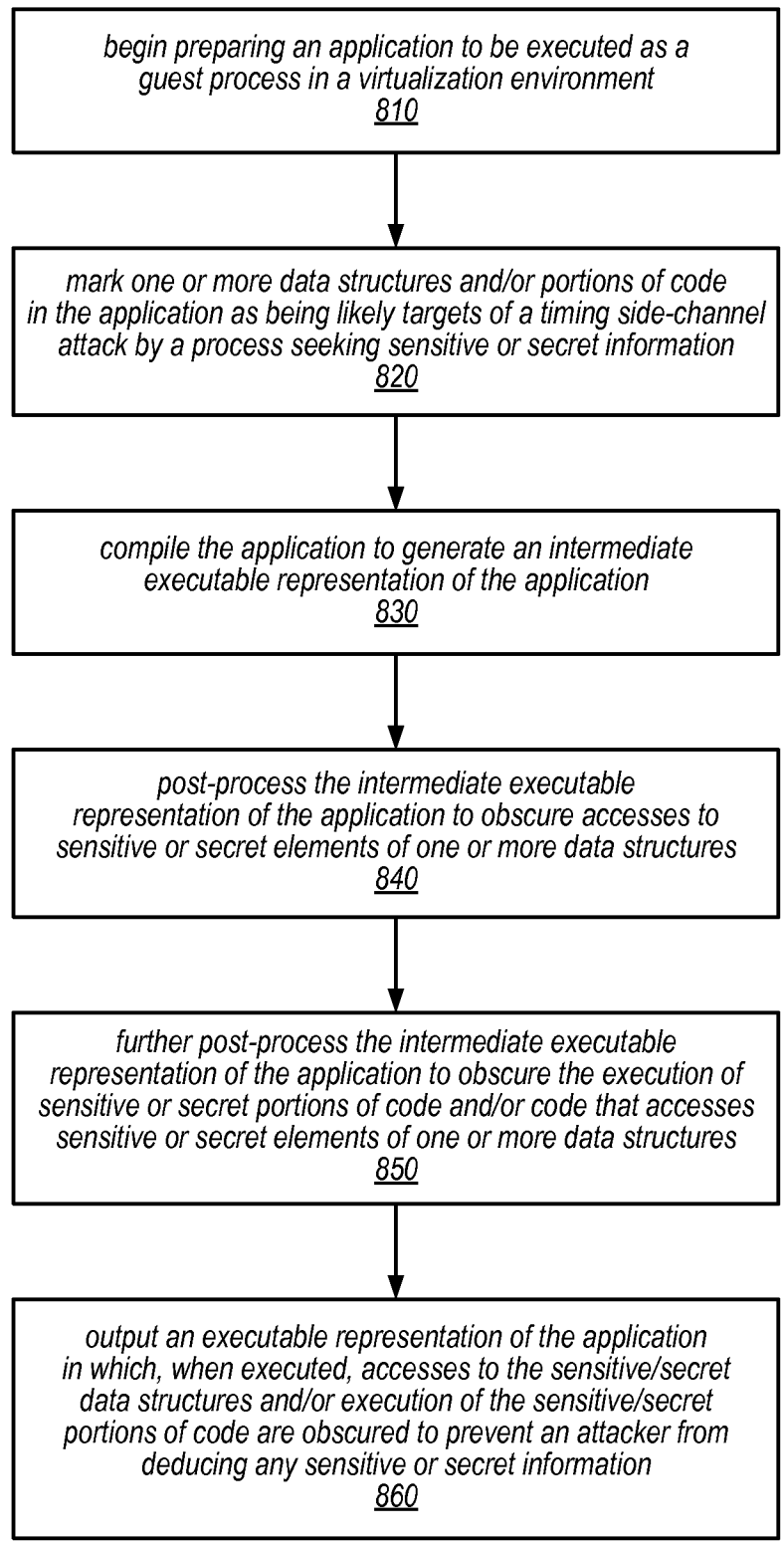
FIG. 8 is a flow diagram illustrating one embodiment of a method for using post-processing to obscure alternatives in code and data.

One embodiment of a method for using post-processing to obscure the use of alternatives in sensitive/secret code and/or data is illustrated by the flow diagram illustrated in FIG. 8. As illustrated at 810, in this example, the method may include beginning preparation of an application to be executed as a guest process in a virtualization environment. The method may include marking (or otherwise instrumenting) one or more data structures and/or portions of code in the application as being likely targets of a timing side-channel attack by a process seeking sensitive or secret information, as in 820, and compiling the application to generate an intermediate executable representation of the application, as in 830.

As illustrated in this example, the method may include post-processing the intermediate executable representation of the application to obscure accesses to sensitive or secret elements of one or more data structures, as in 840. For example, the method may include applying any or all of the techniques described herein for scrambling data elements within a data structure (which may include applying an unpredictable address translation function when mapping the data elements to physical and/or virtual addresses) and/or for merging multiple tables together and interleaving the data elements of the original tables into locations with the merged table.

As illustrated in FIG. 8, the method may also include further post-processing the intermediate executable representation of the application to obscure the execution of sensitive or secret portions of code and/or code that accesses sensitive or secret elements of one or more data structures, as in 850, and outputting an executable representation of the application in which, when executed, accesses to the sensitive/secret data structures and/or execution of the sensitive/secret portions of code are obscured to prevent an attacker from deducing any sensitive or secret information, as in 860. For example, in some embodiments, the method may include interleaving the bytes representing a critical code path with the bytes of another code path so that when the instructions of one of the code paths are fetched from memory during execution, each cache line will contain at least one byte from each of the code paths, as described herein.

Figure 9:
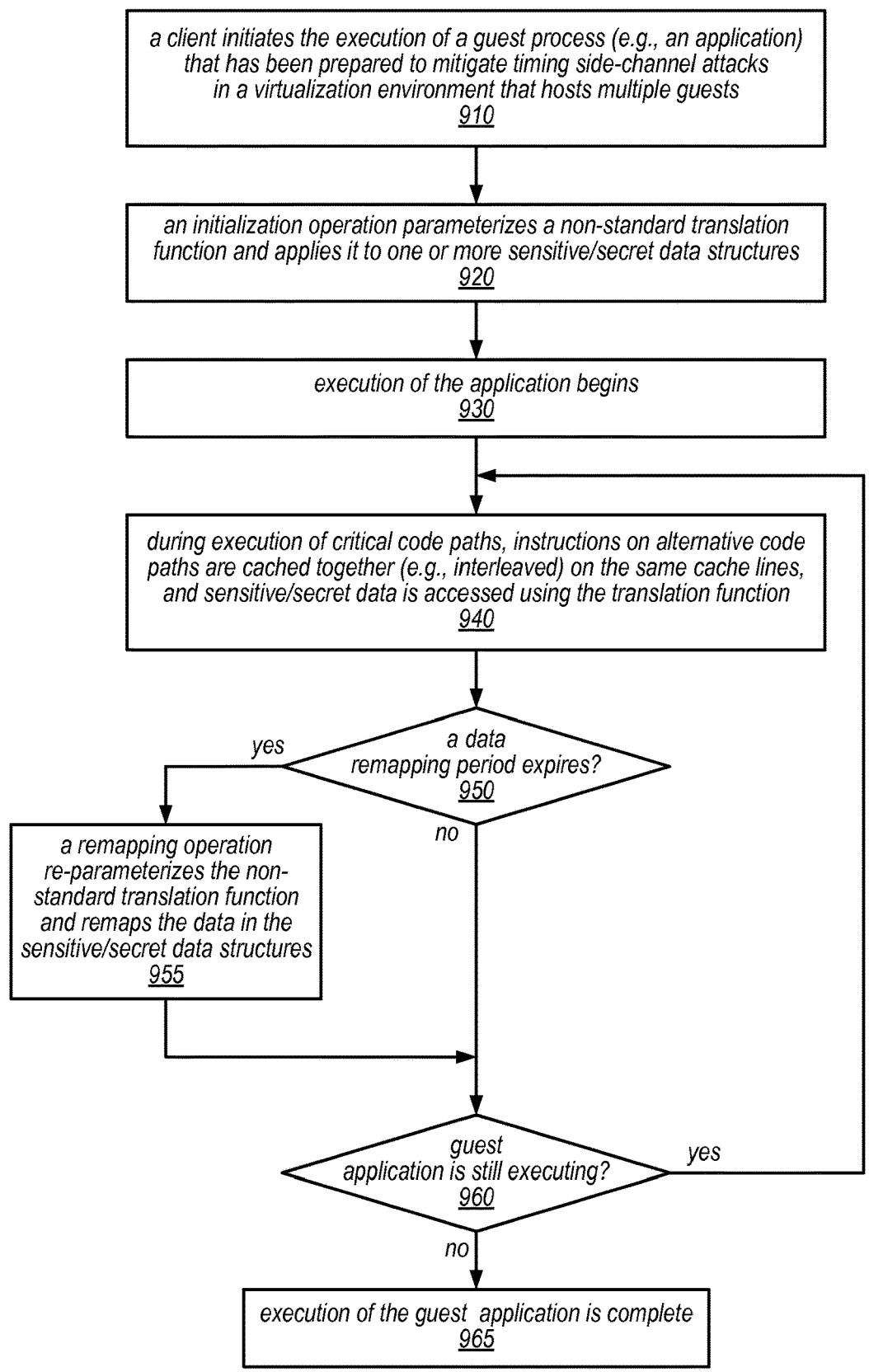
FIG. 9 is a flow diagram illustrating one embodiment of a method for executing code that has been prepared in a manner that obscures accesses to alternative code paths and/or sensitive/secret data, according to at least some embodiments.

One embodiment of a method for executing code that has been prepared in a manner that obscures accesses to alternative code paths and/or sensitive/secret data is illustrated by the flow diagram in FIG. 9. As illustrated at 910, in this example, the method may include a client initiating the execution of a guest process (e.g., an application) that has been prepared to mitigate timing side-channel attacks in a virtualization environment that hosts multiple guests. The method may include an initialization operation of the application parameterizing a non-standard (and unpredictable) address translation function that was inserted in the application by the programmer by an analysis tool (e.g., which may include selecting a random or pseudo-random number on which an address translation function is dependent) and applying the address translation function to one or more sensitive/secret data structures to scramble their data (e.g., to map their constituent data elements to particular unique physical and/or virtual addresses), as in 920, after which execution of the application may begin, as in 930.

As illustrated in this example, the method may include, during execution of each of the critical code paths, caching instructions from alternative code paths together on the same cache lines (e.g., interleaving instructions from multiple portions of those code paths), as in 940, and accessing sensitive/secret data using the non-standard address translation function, using any or all of the methods described herein.

If, at some point, a data remapping period expires (shown as the positive exit from 950), the method may include a remapping operation re-parameterizing the non-standard address translation function and remapping the data in the sensitive/secret data structures (e.g., re-scrambling the data), as in 955. If the application is not configured for periodic remapping or a predefined remapping period has not yet expired (shown as the negative exit from 950), or once such a remapping operation has been performed, if the guest application is still executing (shown as the positive exit from 960), the method may include repeating the operations shown in 940-960, as appropriate, until execution is complete (shown as the negative exit from 960 and 965).

In some embodiments, a library that has been modified to support the techniques described herein (e.g., one that provides special functions for accessing data objects/structures that contain, or are indexed using sensitive/secret data, or that includes tools for marking critical code paths or sensitive/secret data, identifying critical code paths, interleaving alternative code paths on the same cache lines, and/or scrambling data using non-standard and unpredictable address translation functions) may be distributed, or otherwise made available, to virtualization service customers who are concerned about privacy, and who may or may not opt to employ them in their guest virtual machines to avoid or prevent timing side-channel attacks. By offering the library to potential virtualization service customers, thus providing them with a way to execute classified applications and maintain classified data on a guest virtual machine while greatly reducing the likelihood that secrets may be exposed if their code or data is the target of a timing side-channel attack, a service provider may be able to strengthen their case for cloud computing. In some embodiments, such a library may be provided as part of an open source software development kit that customers could build into their own applications. In other embodiments, a virtualization service provider may apply the techniques described herein internally, and/or may increase density when hosting multiple guests (or guests for multiple services) on the same machine while enabling the guests to protect themselves from each other. In other words, as a secondary effect, the techniques described herein may allow a virtualization service provider to increase their guest virtual machine density and/or host machine utilization by allowing page sharing and/or the use of kernel same-page merging in situations in which it was not otherwise suitable due to security considerations, or may increase trust for cloud computing in general, allowing additional (e.g., different) types of workloads to be hosted on their machines and allowing their business to grow.

Figure 10:
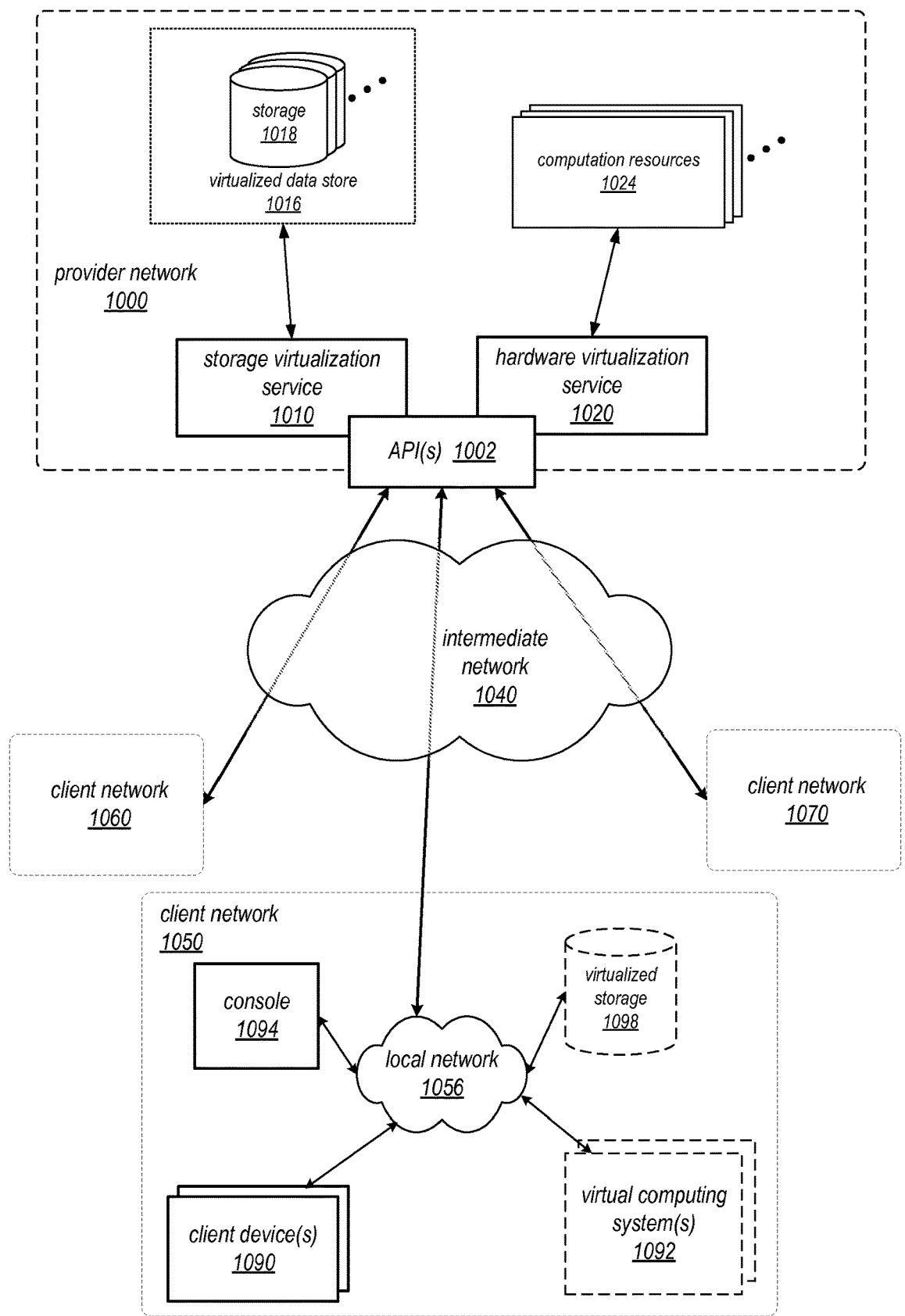
FIG. 10 is a block diagram illustrating an example provider network environment in which some or all of the techniques described herein for detecting, preventing, mitigating, and/or curtailing timing side-channel attacks may be employed, according to at least some embodiments.

FIG. 10 is a block diagram illustrating an example provider network environment in which some or all of the techniques described herein for mitigating timing side-channel attacks may be employed, according to at least some embodiments. In this example, the provider network environment 1000 provides a storage virtualization service and a hardware virtualization service to clients. In this example, hardware virtualization service 1020 provides multiple computation resources 1024 (e.g., VMs) to clients. The computation resources 1024 may, for example, be rented or leased to clients of the provider network 1000 (e.g., to a client that implements client network 1050, client network 1060, and/or client network 1070) in order to implement various applications, which may include observer (e.g., attacking) applications and/or observed (e.g., target) applications. Each computation resource 1024 may be provided with one or more private IP addresses. Provider network 1000 may be configured to route packets from the private IP addresses of the computation resources 1024 to public Internet destinations, and from public Internet sources to the computation resources 1024.

Provider network 1000 may provide a client network (e.g., client network 1050, 1060, or 1070 coupled to intermediate network 1040 via local network 1056) the ability to implement virtual computing systems 1092 via hardware virtualization service 1020 coupled to intermediate network 1040 and to provider network 1000. Note that in some embodiments, each of client networks 1060 and 1070 may include elements that are similar to corresponding elements of client network 1050 (not shown) and may provide functionality similar to that of client network 1050, while in other embodiments, client network 1060 and/or 1070 may include more, fewer, or different elements than those illustrated in FIG. 10 as being part of client network 1050 and/or may provide functionality that is different than that of client network 1050. In some embodiments, hardware virtualization service 1020 may provide one or more APIs 1002, for example a web services interface, via which a client network 1050, 1060, or 1070 may access functionality provided by the hardware virtualization service 1020 via a console such as console 1094. In at least some embodiments, at the provider network 1000, each virtual computing system at a client network (e.g., a virtual computing system 1092 at client network 1050) may correspond to a computation resource 1024 that is leased, rented, or otherwise provided to the client network.

In this example, from an instance of a virtual computing system 1092 and/or another client device 1090 or console 1094 of a client network 1050, 1060, or 1070, a client may access the functionality of storage virtualization service 1010, for example via one or more APIs 1002, to access data from and store data to a virtual data store 1016 provided by the provider network 1000. In some embodiments, a virtualized data store gateway (not shown) may be provided at the client network (e.g., at client network 1050, 1060, or 1070) that may locally cache at least some data, for example frequently accessed or critical data, and that may communicate with storage virtualization service 1010 via one or more communications channels to upload new or modified data from a local cache so that the primary store of data (virtualized data store 1016) is maintained. In at least some embodiments, a user, via a virtual computing system 1092 and/or on another client device 1090, may mount and access one or more storage volumes 1018 of virtual data store 1016, each of which appears to the user as local virtualized storage 1098.

Figure 11:
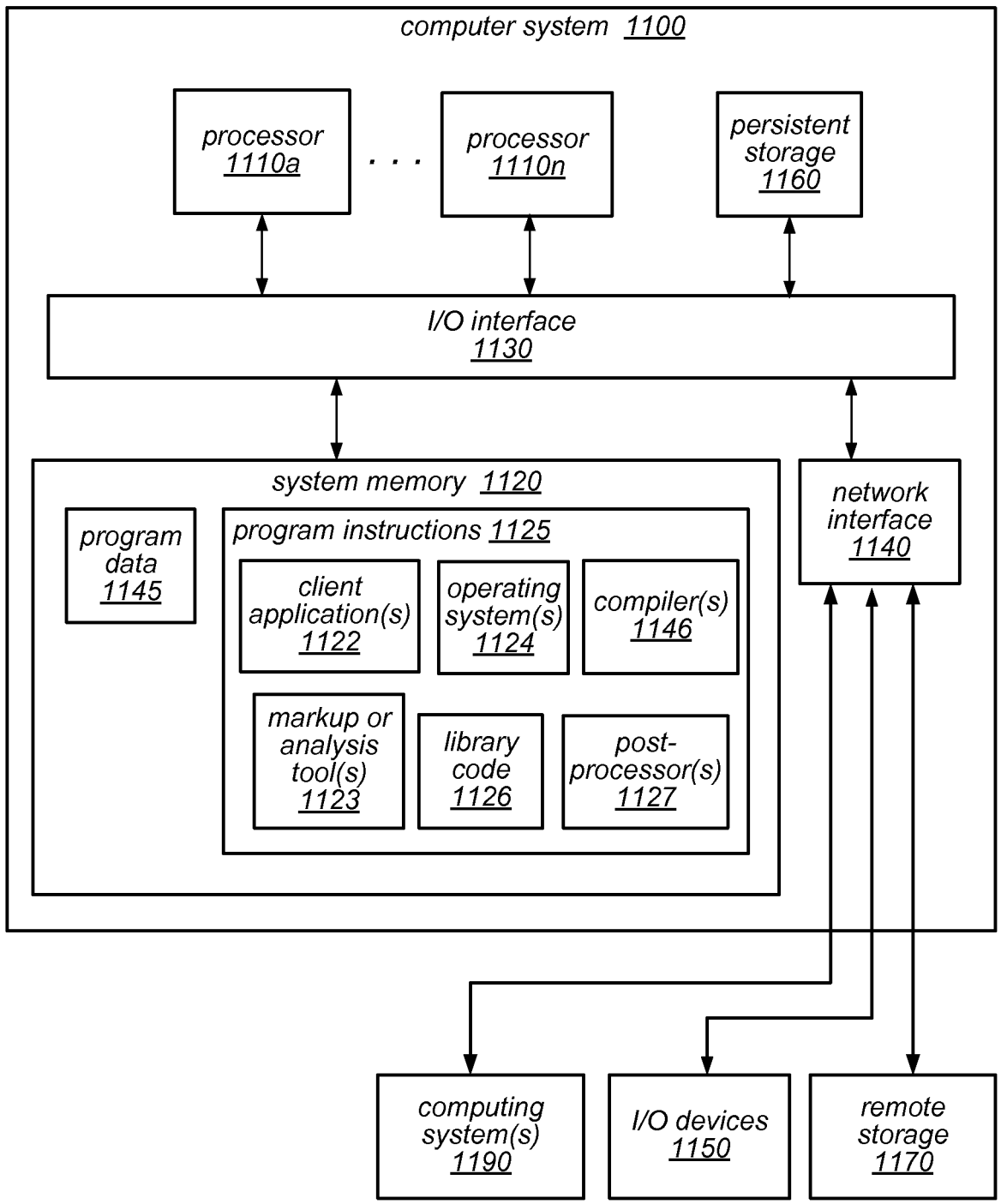
FIG. 11 is a block diagram illustrating a computer system configured to implement some or all of the techniques described herein, according to various embodiments.

The methods described herein may in various embodiments be implemented by any combination of hardware and software. For example, in one embodiment, some or all of the methods may be implemented by a computer system that includes a processor executing program instructions stored on a computer-readable storage medium coupled to the processor. The program instructions may be configured to implement any or all of the functionality described herein for mitigating timing side-channel attacks, in different embodiments. FIG. 11 is a block diagram illustrating a computer system configured to implement some or all of the techniques described herein, according to various embodiments. Computer system 1100 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Note that computer system 1100 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein.

Computer system 1100 includes one or more processors 1110 (any of which may include multiple cores, which may be single or multi-threaded) coupled to a system memory 1120 via an input/output (I/O) interface 1130. Note that while several examples described herein are directed to systems in which the processors implement an x116 instruction set, the techniques described herein are not limited to such embodiments. Computer system 1100 further includes a network interface 1140 coupled to I/O interface 1130. In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. The computer system 1100 also includes one or more network communication devices (e.g., network interface 1140) for communicating with other systems and/or components over a communications network (e.g. Internet, LAN, etc.). For example, a client application executing on system 1100 may use network interface 1140 to communicate with a server application executing on a single server or on a cluster of servers that implement a distributed system. In another example, an instance of a server application executing on computer system 1100 may use network interface 1140 to communicate with a client application and/or with other instances of the server application that may be implemented on other computer systems.

In the illustrated embodiment, computer system 1100 also includes one or more persistent storage devices 1160. In various embodiments, persistent storage devices 1160 may correspond to disk drives, tape drives, solid state memory, other mass storage devices, or any other persistent storage device. Computer system 1100 (or an application, software component, or operating system operating thereon) may store instructions and/or data in persistent storage devices 1160, as desired, and may retrieve the stored instruction and/or data as needed.

Computer system 1100 includes one or more system memories 1120 that are configured to store instructions and data accessible by processor 1110. In various embodiments, system memories 1120 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1120 may contain program instructions 1125 that are executable by processor(s) 1110 to implement the methods and techniques described herein for mitigating timing side-channel attacks including, but not limited to marking critical code paths or sensitive/secret data, identifying critical code paths, interleaving alternative code paths on the same cache lines, and/or scrambling data using non-standard and unpredictable address translation functions. In various embodiments, program instructions 1125 may be encoded in platform native binary, any interpreted language such as Java™ byte-code, or in any other language such as C/C++, Java™, etc., or in any combination thereof. For example, in the illustrated embodiment, program instructions 1125 include program instructions executable to implement one or more client application(s) 1122 (which may include observer programs that carry out, or attempt to carry out, timing side-channel attacks and/or observed applications that may be targeted by a timing side-channel attack), various markup and/or analysis tool(s) 1123, library code 1126, compiler 1146, post-processor(s) 1127, and/or operating system(s) 1124, which may include or be implemented as a hypervisor or virtual machine monitor, or any of various operating systems, such as UNIX, LINUX, Solaris™, MacOS™, Windows™, etc. Note also that in various embodiments, a markup or analysis tool 1123, post-processor 1127, or library code 1126 may be implemented as a component of an operating system 1124.

Note that in various embodiments, some or all of system memory 1110 (including some or all of program instructions 1125 and/or program data 1145) may be implemented within shared physical memory pages in a stand-alone computing system or in a system that provides virtualized resources to clients, as described herein. Note also that in some embodiments, library code 1126 may be loaded into a portion of system memory 1120 other that the portion of system memory 1120 that includes program instructions 1125 and/or may include a private copy of a shared library (or a portion thereof). Similarly, program data 1145 may in some embodiments include memory pages that contain sensitive/secret data structures and/or sensitive program data.

Any or all of program instructions 1125, including client application(s) 1122, markup and/or analysis tool(s) 1123, library code 1126, compiler 1146, post-processor(s) 1127, and/or operating system(s) 1124, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1100 via I/O interface 1130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1140.

In some embodiments, system memory 1120 may include storage for program data 1145, such as the sensitive/secret data structures of client applications, as described herein. In various embodiments, system memory 1120 (e.g., program data 1145 within system memory 1120) and/or remote storage 1170 may also store other information usable in implementing the methods and techniques described herein (e.g., heuristics or expert rules for identifying critical code paths or sensitive/secret data).

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems 1190 (which may implement one or more server nodes and/or clients of a distributed system), for example. In addition, network interface 1140 may be configured to allow communication between computer system 1100 and various I/O devices 1150 and/or remote storage 1170. Input/output devices 1150 may, in some embodiments, include one or more display terminals, keyboards, keypads, touchpads, scanning devices, voice or optical recognition devices, or any other devices suitable for entering or retrieving data by one or more computer systems 1100. Multiple input/output devices 1150 may be present in computer system 1100 or may be distributed on various nodes of a distributed system that includes computer system 1100. In some embodiments, similar input/output devices may be separate from computer system 1100 and may interact with one or more nodes of a distributed system that includes computer system 1100 through a wired or wireless connection, such as over network interface 1140. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol. In various embodiments, computer system 1100 may include more, fewer, or different components than those illustrated in FIG. 11 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A non-transitory computer-readable storage medium storing program instructions that when executed on one or more computers cause the one or more computers to implement a compiler, wherein the compiler is configured to perform:
   preparing application code for execution as a guest process in a virtualization environment that hosts multiple guest processes on behalf of one or more clients, wherein said preparing comprises:
      identifying a data structure within the application code as a likely target of a timing side-channel attack by guest processes that seek to deduce sensitive or secret information through observation of accesses to the data structure during execution; and
      generating an executable representation of the application code in which, when executed on one or more of the one or more computers,
   accesses to the identified data structure are obscured in a manner that prevents an attacking guest process from deducing the sensitive or secret information, wherein said generating comprises inserting executable code into the executable representation of the application code, the executable code representing an address translation function for accesses that target the identified data structure, such that when the executable representation of the application code is executed, the address translation function executes and modifies the accesses to the identified data structure such that one or more of a plurality of elements of the identified data structure have unpredictable locations.

2. The non-transitory computer-readable storage medium of claim 1, wherein the identified data structure stores one or more cryptography keys or data derived from, or usable to generate, one or more cryptography keys.

3. The non-transitory computer-readable storage medium of claim 1,
   wherein said identifying comprises determining that the data structure has been marked by a programmer or by an analysis tool as being sensitive or secret; and
   wherein said generating is performed in response to determining that the data structure has been marked by a programmer or by an analysis tool as being sensitive or secret.

4. The non-transitory computer-readable storage medium of claim 1,
   wherein said preparing further comprises:
      identifying two alternative code paths within the application code whose execution is usable to deduce sensitive or secret information; and
      interleaving one or more portions of one of the two alternative code paths with one or more portions of the other one of the two alternative code paths such that, during execution of the guest process in the virtualization environment, the two alternative code paths access the same set of one or more cache lines.

5. The non-transitory computer-readable storage medium of claim 4, wherein said identifying the two alternative code paths comprises determining that at least one of the two alternative code paths access the identified data structure.

6. The non-transitory computer-readable storage medium of claim 4,
   wherein said interleaving comprises inserting, in at least one of the cache lines in the set of one or more cache lines, code representing a local jump type instruction that, during execution of the guest process in the virtualization environment, causes execution to flow from a chunk of code from the portion of code that resides on one cache line to another chunk of code from the portion of code that resides on a different cache line or causes execution to skip over a portion of the one of the two alternative code paths that is not taken.

7. A system, comprising:
   a virtualization environment, implemented by one or more computing devices and configured to host multiple guest processes;
   wherein, during execution, a given one of the multiple guest processes is configured to:
      generate, according to an address translation function executing as part of the given one of the multiple guest processes, a layout for a data structure that has been identified as a likely target of timing side-channel attacks executed by other guest processes; and access at least some elements of the data structure through the address translation function executing as part of the given one of the multiple guest processes, wherein the accesses to the at least some elements of the data structure are modified by the address translation function such that the at least some elements of the data structure have unpredictable locations;

wherein the layout generated according to the address translation function obscures accesses to at least some elements of the data structure in a manner that prevents an attacking guest process from deducing sensitive or secret information stored in the data structure or sensitive or secret information used in determining an index into the data structure through observation of cache accesses.

8. The system of claim 7, wherein to generate the layout for the data structure, the given one of the multiple guest processes is configured to apply the address translation at a granularity that is configurable and that is at most the granularity of a single cache line.

9. The system of claim 7, wherein to generate the layout for the data structure, the given one of the multiple guest processes is configured to apply the address translation at a granularity that is configurable and that is at most the granularity of a single element or entry in the data structure.

10. The system of claim 7,
wherein, during execution, the given one of the multiple guest processes is configured to access at least one element of the data structure; and
wherein to access the at least one element of the data structure, the given one of the multiple guest processes is configured to apply the address translation function to a target address argument of an access operation that is directed to the data structure.

11. A method, comprising:
preparing, by a compiler, application code for execution as a guest process in a virtualization environment that hosts multiple guest processes on behalf of one or more clients, wherein said preparing comprises:
identifying a data structure as a likely target of a timing side-channel attack by guest processes that seek to deduce sensitive or secret information through observation of accesses to the data structure during execution; and
generating an executable representation of the application code in which, when executed on one or more of the one or more computers, accesses to the identified data structure are obscured in a manner that prevents an attacking guest process from deducing the sensitive or secret information, wherein said generating comprises inserting executable code into the executable representation of the application code, the executable code representing an address translation function for accesses that target the identified data structure, such that when the executable representation of the application code is executed, the address translation function executes and modifies the accesses to the identified data structure such that one or more of a plurality of elements of the identified data structure have unpredictable locations.

12. The method of claim 11, wherein the identified data structure stores one or more cryptography keys or data derived from, or usable to generate, one or more cryptography keys.

13. The method of claim 11,
wherein said identifying comprises determining that the data structure has been marked by a programmer or by an analysis tool as being sensitive or secret; and
wherein said generating is performed in response to determining that the data structure has been marked by a programmer or by an analysis tool as being sensitive or secret.

14. The method of claim 11, wherein said preparing further comprises:
identifying two alternative code paths within the application code whose execution is usable to deduce sensitive or secret information; and
interleaving one or more portions of one of the two alternative code paths with one or more portions of the other one of the two alternative code paths such that, during execution of the guest process in the virtualization environment, the two alternative code paths access the same set of one or more cache lines.

15. The method of claim 14, wherein said identifying the two alternative code paths comprises determining that at least one of the two alternative code paths access the identified data structure.

16. The method of claim 14,
wherein said interleaving comprises inserting, in at least one of the cache lines in the set of one or more cache lines, code representing a local jump type instruction that, during execution of the guest process in the virtualization environment, causes execution to flow from a chunk of code from the portion of code that resides on one cache line to another chunk of code from the portion of code that resides on a different cache line or causes execution to skip over a portion of the one of the two alternative code paths that is not taken.

* * * * *